United States Patent
Tiramani et al.

(10) Patent No.: US 11,034,204 B2
(45) Date of Patent: Jun. 15, 2021

(54) VEHICLE SUSPENSION

(71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vegas, NV (US)

( * ) Notice: Subject to any disclaimer, the term of this patent is extended or adjusted under 35 U.S.C. 154(b) by 94 days.

(21) Appl. No.: 16/579,524

(22) Filed: Sep. 23, 2019

(65) Prior Publication Data

US 2020/0094639 A1 Mar. 26, 2020

Related U.S. Application Data

(60) Provisional application No. 62/735,966, filed on Sep. 25, 2018, provisional application No. 62/736,021, filed on Sep. 25, 2018, provisional application No. 62/736,066, filed on Sep. 25, 2018.

(51) Int. Cl.
*B60G 15/06* (2006.01)
*B60G 21/00* (2006.01)
(Continued)

(52) U.S. Cl.
CPC .................. *B60G 7/02* (2013.01); *B60G 3/18* (2013.01); *B60G 7/001* (2013.01); *B60G 7/003* (2013.01);
(Continued)

(58) Field of Classification Search
CPC .......... B60G 7/02; B60G 3/18; B60G 15/063; B60G 15/067; B60G 21/05; B60G 21/055;
(Continued)

(56) References Cited

U.S. PATENT DOCUMENTS 5,251,930 A * 10/1993 Kusaka .................. B60G 11/08
267/260
2008/0042390 A1* 2/2008 Geslin ...................... B60G 7/02
280/124.1

(Continued)

FOREIGN PATENT DOCUMENTS

WO   2009028942       3/2009
WO   2009028942 A1    3/2009
(Continued)

OTHER PUBLICATIONS

International Search Report and Written Opinion dated Nov. 19, 2019, in International Application No. PCT/US2019/052475.
(Continued)

*Primary Examiner* — Paul N Dickson
*Assistant Examiner* — Maxwell L Meshaka

(57) ABSTRACT

A vehicle suspension having a first load-bearing component assembly and a second load-bearing component assembly. The first and second load bearing component assemblies are adapted to be transversely positioned across from each other on a vehicle chassis. A directionally-dependent heave spring assembly is adapted to be transversely secured to a vehicle chassis, the heave spring assembly is coupled to the first load-bearing component assembly and to the second load-bearing component assembly and exhibits resiliency in opposition to upward vertical movement of both wheel hub assemblies relative to their rest states, and exhibits substantially no resiliency in opposition to downward vertical movement of both wheel assemblies relative to their rest states.

3 Claims, 30 Drawing Sheets

(51) Int. Cl.
  *B60G 3/18* (2006.01)
  *B60G 7/02* (2006.01)
  *B62D 17/00* (2006.01)
  *B60G 7/00* (2006.01)
  *B62D 21/11* (2006.01)
  *B62D 23/00* (2006.01)

(52) U.S. Cl.
  CPC ............ *B60G 7/008* (2013.01); *B60G 15/063* (2013.01); *B60G 15/067* (2013.01); *B60G 21/005* (2013.01); *B62D 17/00* (2013.01); *B62D 21/11* (2013.01); *B62D 23/005* (2013.01); *B60G 2200/144* (2013.01); *B60G 2202/12* (2013.01); *B60G 2202/312* (2013.01); *B60G 2204/124* (2013.01); *B60G 2204/143* (2013.01); *B60G 2204/148* (2013.01); *B60G 2204/61* (2013.01); *B60G 2206/60* (2013.01)

(58) Field of Classification Search
  CPC .......... B60G 2200/34; B60G 2202/136; B60G 2202/135; B60G 2202/114
  USPC .................................................. 280/124.103
  See application file for complete search history.

(56) References Cited

U.S. PATENT DOCUMENTS

| | | | | |
|---|---|---|---|---|
| 2010/0276901 | A1* | 11/2010 | Richardson | B60G 3/20 280/93.512 |
| 2012/0146309 | A1* | 6/2012 | Fruhmann | B60G 11/10 280/124.175 |
| 2012/0153593 | A1* | 6/2012 | Fruhmann | B60G 11/12 280/124.175 |
| 2013/0241167 | A1* | 9/2013 | Perri | B60G 11/08 280/124.134 |
| 2016/0001627 | A1* | 1/2016 | Kobayashi | B60G 21/0551 248/596 |
| 2016/0159180 | A1* | 6/2016 | Palatov | B60G 13/18 280/5.507 |
| 2018/0194187 | A1* | 7/2018 | Kashani | B60G 3/06 |

FOREIGN PATENT DOCUMENTS

| | | | | |
|---|---|---|---|---|
| WO | WO-2009028942 | A1 * | 3/2009 | ............ B60G 11/08 |
| WO | 2013072873 | | 5/2013 | |
| WO | 2013072873 | A2 | 5/2013 | |
| WO | WO-2013072873 | A2 * | 5/2013 | ......... B60G 21/0553 |

OTHER PUBLICATIONS

U.S. Appl. No. 16/168,957, filed Oct. 24, 2018, Paolo Tiramani et al.
U.S. Appl. No. 16/168,978, filed Oct. 24, 2018, Paolo Tiramani et al.
U.S. Appl. No. 16/579,554, filed Sep. 23, 2019, Paolo Tiramani et al.
U.S. Appl. No. 16/579,571, filed Sep. 23, 2019, Paolo Tiramani et al.
U.S. Appl. No. 16/589,308, filed Oct. 1, 2019, Paolo Tiramani et al.

* cited by examiner

VEHICLE SUSPENSION

CROSS-REFERENCES TO RELATED APPLICATIONS

This application claims the benefit of U.S. Provisional Application No. 62/736,021, filed Sep. 25, 2018, U.S. Provisional Application No. 62/735,966, filed Sep. 25, 2018 and U.S. Provisional Application No. 62/736,066, filed Sep. 25, 2018.

BACKGROUND OF THE INVENTION

Field of the Invention

This invention relates to vehicle suspension design.

Description of the Related Art

The design of an automotive vehicle suspension presents a variety of challenges. The suspension must ameliorate the impact of road-induced shocks to protect both passengers, cargo and vehicle components, while keeping as uniform, and as safe as possible, the sensory feedback to the driver, and the driver control inputs (e.g., steering, braking) required to maneuver the vehicle and respond to road surface variations. At the same time, the suspension design and placement should not compromise powertrain performance, vehicle aerodynamics or aesthetics, driver ergonomics, passenger comfort, cargo-carrying ability, or the serviceability of either the engine or other vehicle components. In turn, the suspension design should not result in having components poorly located: i.e., positioned adjacent heat sources, or potentially exposed to deleterious materials.

SUMMARY OF THE INVENTION

The present invention provides an automotive suspension system whose components are designed, and cooperate with each other, to permit to a great degree the independent tuning of suspension components to deal with a variety of vehicle handling and performance scenarios, including aerodynamic effects that during high speed operation tend to push down on the vehicle, causing it to squat.

Further, design of the automotive suspension system in accordance with the present invention, and utilization of the preferred chassis mounting systems disclosed herein, allows the suspension components to be positioned and secured to the automotive chassis proximate to its structural elements to yield a strong configuration that facilitates maintenance, minimizes engine-generated heat loads which could deleteriously impact suspension components, and keeps the interior portions of the vehicle relatively free of suspension components and therefore available for other uses.

In one aspect, the invention comprises a vehicle suspension having a first load-bearing component assembly and a second load-bearing component assembly, where the first and second load bearing component assemblies are adapted to be transversely positioned across from each other on a vehicle chassis. Each load-bearing component assembly comprises a wheel hub, an upper control arm having an apex portion and a base portion, and a lower control arm having an apex portion and a base portion, where each wheel hub is supported between the apex portions of the upper control arm and the lower control arm of the respective load-bearing component assemblies. The base portion of each of the upper and lower control arms of the respective load-bearing component assemblies is adapted to be pivotally secured to a vehicle chassis to permit upward and downward vertical movement of each wheel hub, relative to a rest state, in response to load variations. A directionally-dependent heave spring assembly is adapted to be transversely secured to a vehicle chassis, where the heave spring assembly is coupled to the first load-bearing component assembly and to the second load-bearing component assembly and exhibits resiliency in opposition to upward vertical movement of both wheel hub assemblies relative to their rest states, and exhibits substantially no resiliency in opposition to downward vertical movement of both wheel assemblies relative to their rest states.

These and other aspects of the present invention are described in the drawings annexed hereto, and in the description of the preferred embodiments and claims set forth below.

DETAILED DESCRIPTION OF THE PREFERRED EMBODIMENTS

Figure 1A:
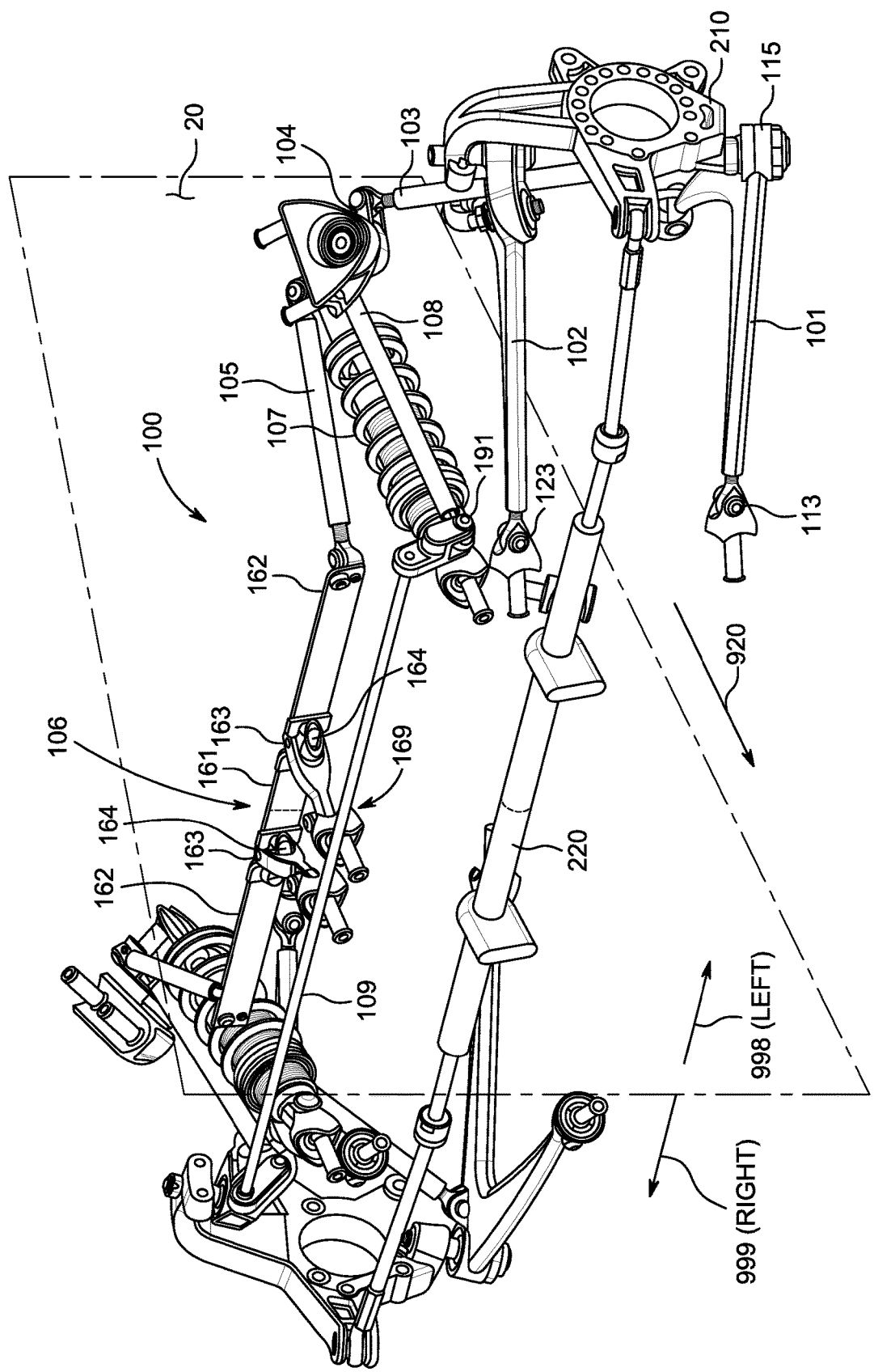
FIG. 1A is a perspective view of the suspension of the present invention.

FIG. 1A depicts the suspension 100 of the present invention in its rest state, in an orientation for mounting to the forward portion of a vehicle chassis 15 of a vehicle 10. The term "rest state" means that the only loads imposed on suspension 100 are those resulting from the weight of vehicle 10 when positioned on a horizontal, level road. Although shown in FIG. 1A oriented for mounting to the forward portion of a vehicle chassis 15, suspension 100 can also be oriented for mounting to the rear portion of a vehicle chassis 15, as disclosed further below.

Figure 1B:
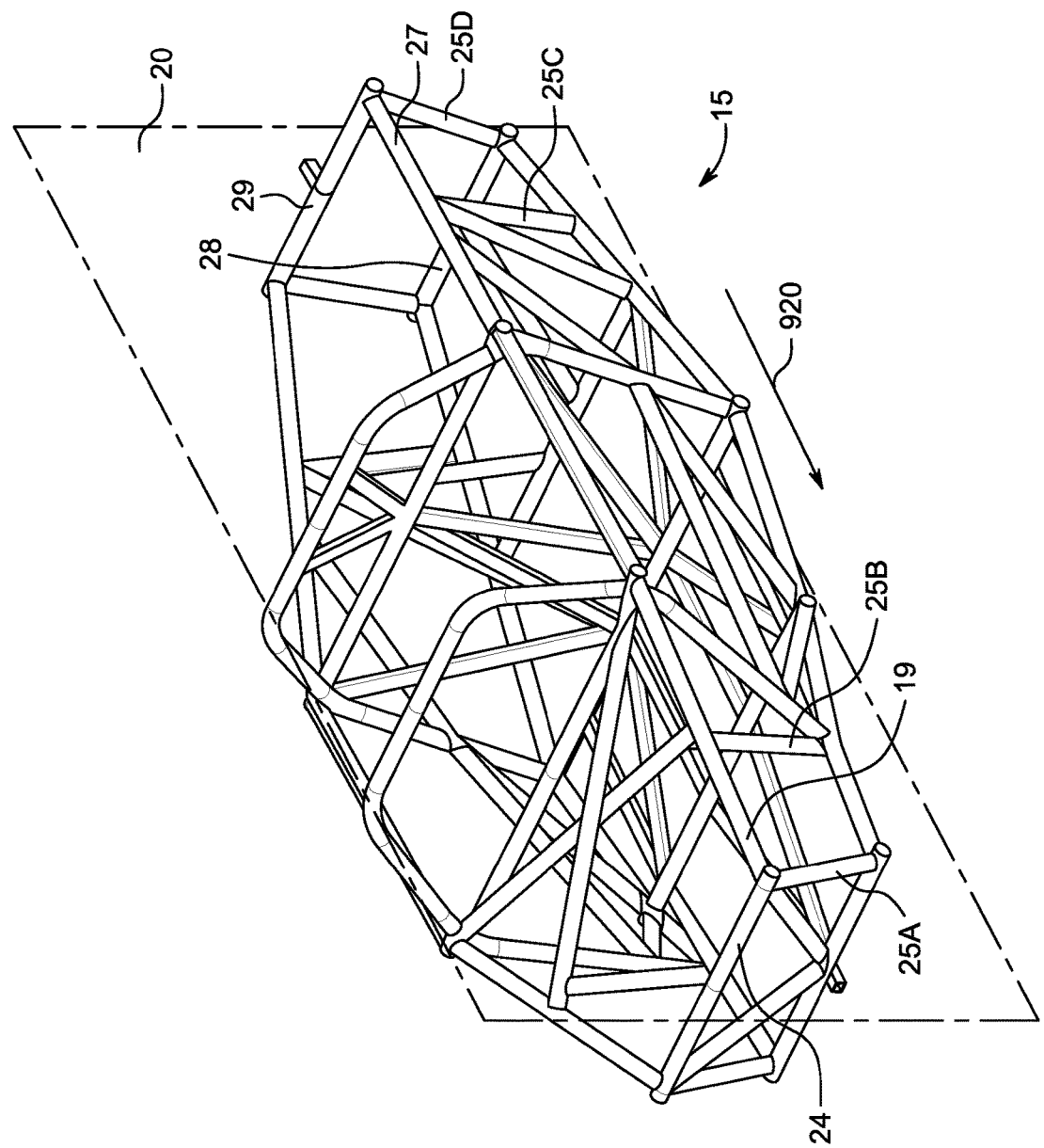
FIG. 1B is a perspective view of a vehicle chassis to which the suspension of the present invention can be secured.
Figure 1C:
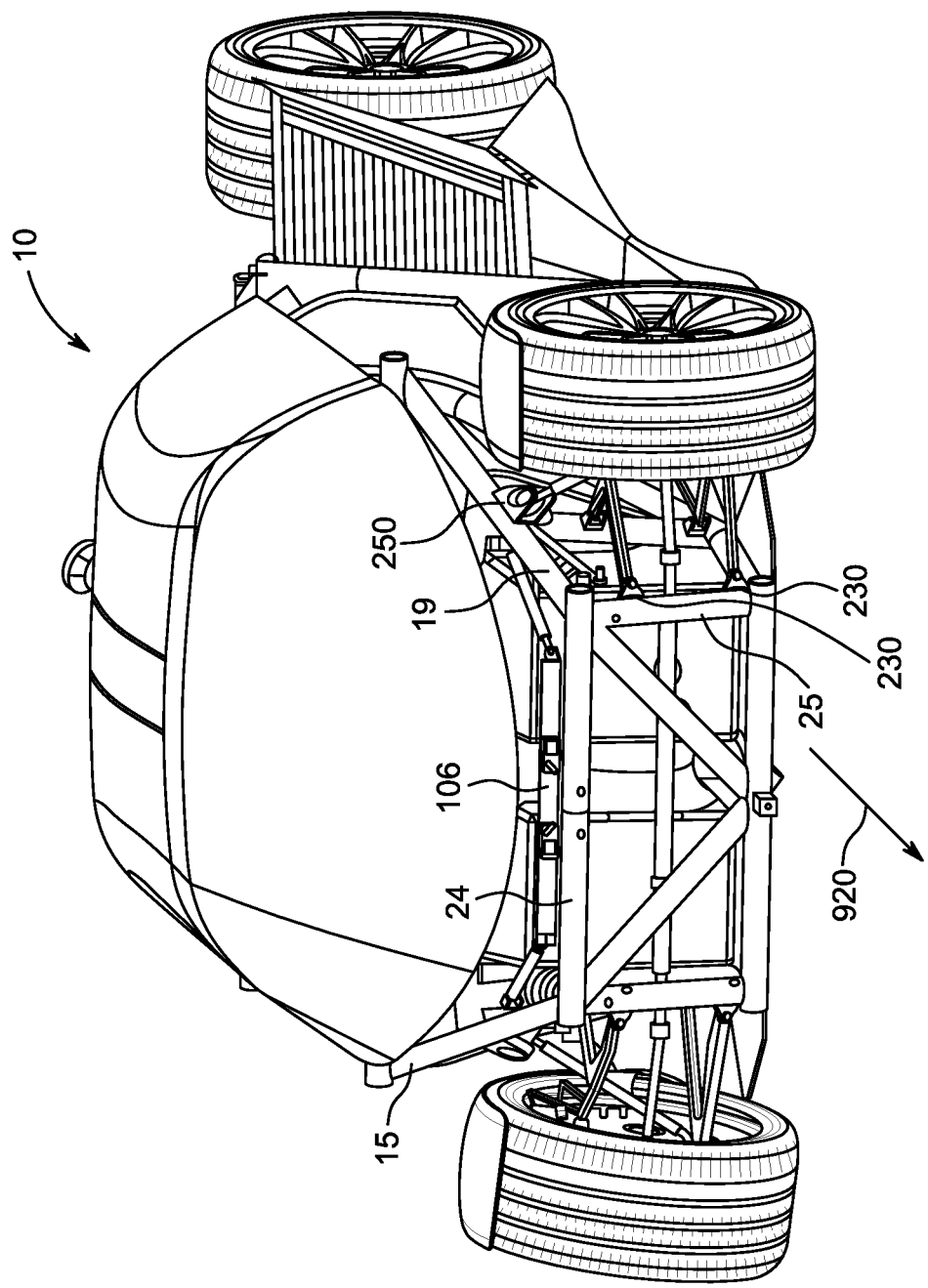
FIG. 1C is a perspective view of an exemplary utilization of the suspension of the present invention in the front of a vehicle.
Figure 13A:
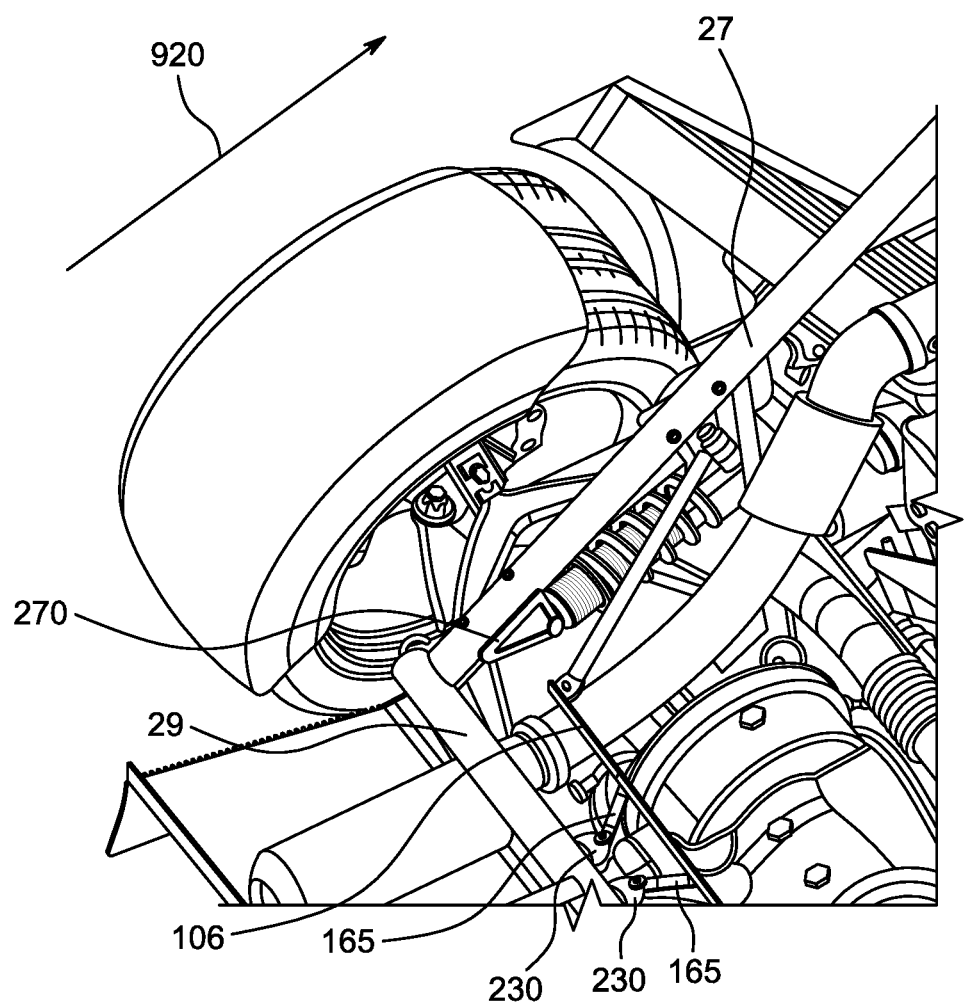
FIG. 13A is a perspective view of an exemplary utilization of the suspension of the present invention in the rear of a vehicle.
Figure 13B:
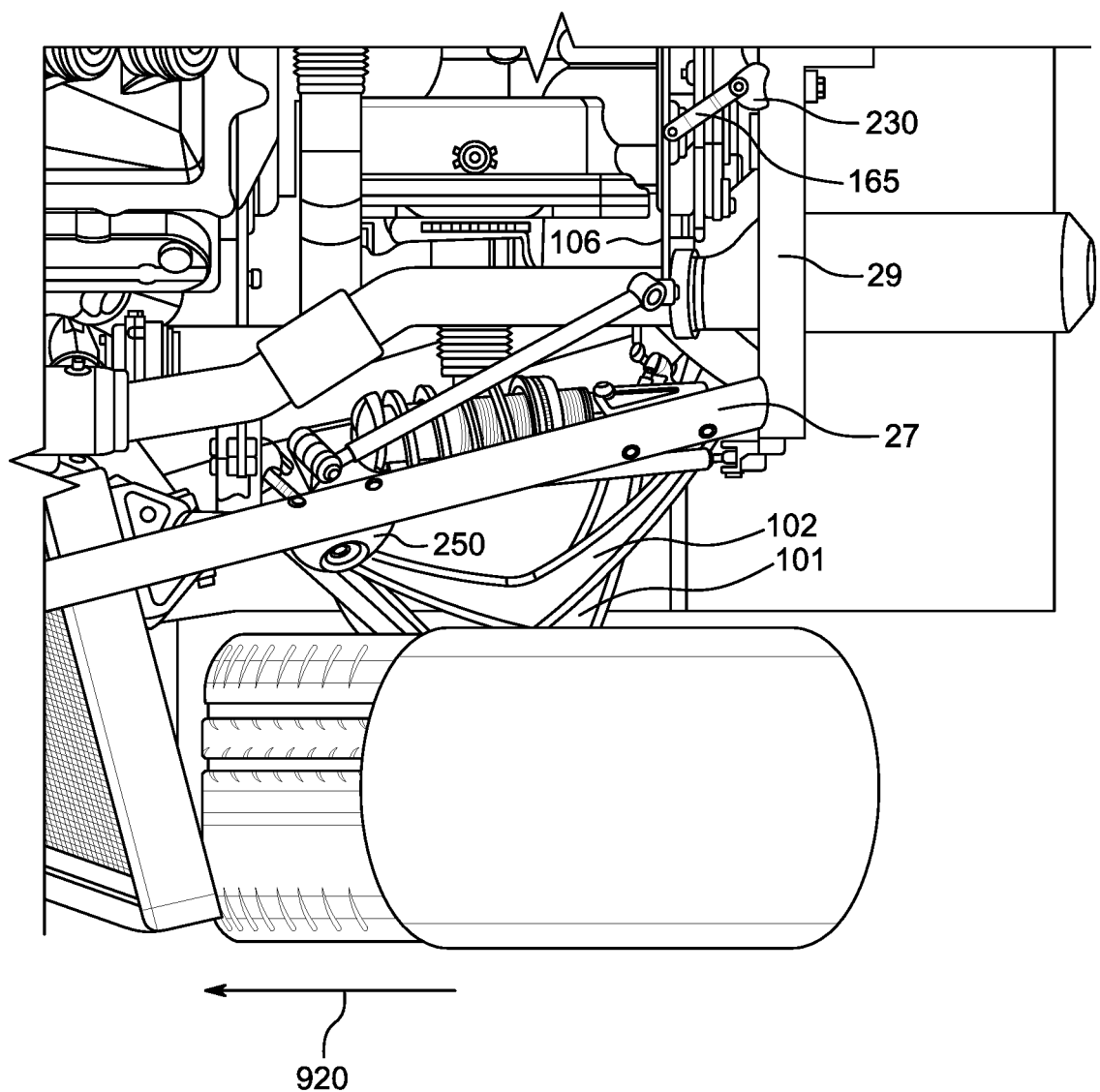
FIG. 13B is a top view of an exemplary utilization of the suspension of the present invention in the rear of a vehicle.

FIG. 1B shows a chassis 15 on which suspension 100 can be mounted. Chassis 15 is characterized by a number of tubular members fastened to each other and arranged to form a three dimensional exoskeleton structure, sometimes referred to as a space frame. An exemplary vehicle 10 utilizing both chassis 15 and suspension 100 is depicted in FIGS. 1C, 13A and 13B. Otherwise in the figures, suspension 100 is depicted separately from vehicle 10 and chassis 15 so as to more clearly illustrate the inventions described and claimed herein. Although described with respect to the particular structure of chassis 15 for illustrative purposes, suspension 100 and the inventions described herein can be utilized with a variety of different chassis designs.

The direction of forward travel is depicted in FIGS. 1A, 1B and 1C by the arrow 920. Accordingly, reference herein to the "forward" direction, and like references, refers to orientations or movement toward the head of the arrow 920. Correspondingly, reference herein to the "rearward" direction, and like references, refers to orientations or movement away from the head of the arrow 920. Any plane or direction parallel to the surface on which the vehicle 10 travels is referred to herein as the "horizontal" plane or direction, and any plane or direction orthogonal to that surface is referred to as the "vertical" plane or direction.

Suspension 100 is symmetric about a vertically-oriented longitudinal plane 20 (shown in FIGS. 1A and 1B), which divides the vehicle chassis 15 into equal halves and which is parallel to the direction of travel. Any vertical plane parallel to this longitudinal plane 20, and any generally horizontal orientation approximately parallel to this longitudinal plane, is referred to herein as being oriented in a longitudinal direction. Any vertical plane perpendicular to this longitudinal plane 20, and any generally horizontal orientation approximately orthogonal to this longitudinal plane, is referred to herein as being oriented in a transverse direction. In addition, reference herein to the "left" side of suspension 100, or to portions or components positioned on the left side of suspension 100, refers to the portions or components to the left of longitudinal plane 20, as referenced with regard to the left-hand side of a driver, facing forward, on vehicle chassis 15; for clarity, the "Left" side of suspension 100 is expressly denoted as such ("LEFT"; alternatively denoted direction 998) in FIG. 1A.

Likewise, reference herein to the "right" side of suspension 100, or to portions or components positioned on the right side of suspension 100, refers to the portions or components to the right of longitudinal plane 20, as referenced with regard to the right-hand side of a driver, facing forward, on vehicle chassis 15; again for clarity, the "Right" side of suspension 100 is expressly denoted as such ("RIGHT"; alternatively denoted direction 999) in FIG. 1A. For convenience of reference, and except as desirable to explain suspension response to load changes (described further below), the suspension 100 will be described generally with reference to the left side of suspension 100 in the drawings, it being the case that the description equally applies to the right side of suspension 100.

Figure 2:
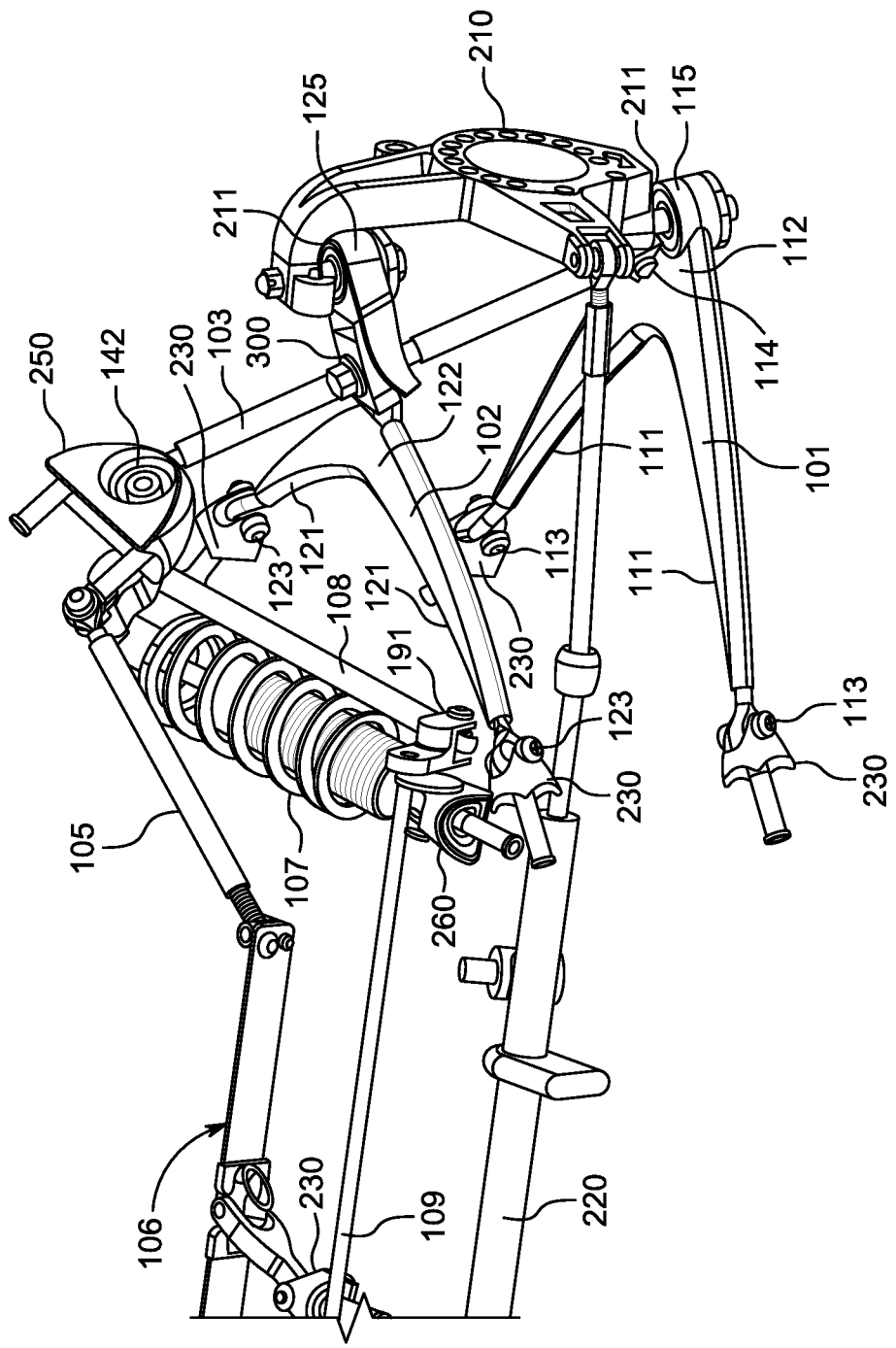
FIG. 2 is a perspective view of the left side of the suspension of the present invention.

Each side of suspension 100 utilizes an A-arm wheel suspension having a lower control arm 101 and an upper control arm 102. As shown in FIGS. 1 and 2, the base portions 111 of each lower control arm 101 are adapted to be secured to chassis 15 with two lower bushings 113, which permit control arm 101 to be angularly rotated about the bushings. The forward lower bushing 113 of lower control arm 101 is revolutely secured to first upright tubular member 25A, and the rear lower bushing of lower control arm 101 is revolutely secured to second upright tubular member 25B, both tubular members being shown in FIG. 1B. Tubular members 25A and 25B are generally circular in cross section, and lower bushings 113 are secured to these tubular members preferably utilizing general purpose anchors 230, depicted for example in FIG. 2, and described further below in connection with FIGS. 5A-5H. The apex portion 112 of lower control arm 101 is provided with a lower sleeve 115 (see FIG. 2) for receiving a ball joint.

Likewise, the base portions 121 of each upper control arm 102 are adapted to be secured to chassis 15 with two upper bushings 123, which permit upper control arm 102 to be angularly rotated about the bushings. The forward upper bushing 123 of upper control arm 121 is revolutely secured to first upright tubular member 25A, and the rear upper bushing of upper control arm 121 is revolutely secured to second upright tubular member 25B. Upper bushings 123 are secured to these tubular members preferably utilizing general purpose anchors 230, depicted in FIG. 2. The apex portion 122 of upper control arm 121 is provided with an upper sleeve 125 (see FIG. 2) for receiving a ball joint.

As shown in FIG. 2, a wheel alignment mechanism 300 is preferably secured to upper control arm 102 to permit adjustment of wheel caster and camber. Details regarding specific designs of wheel alignment mechanism 300 are disclosed in U.S. Provisional Application No. 62/736,066 entitled "Wheel Alignment Mechanism," filed on Sep. 25, 2018 and having the same inventors as the subject application; the contents of that "Wheel Alignment Mechanism" application relating to the designs of wheel alignment mechanism 300 referenced above are hereby incorporated by reference into the present disclosure as if fully set forth herein. In addition, the contents of U.S. Nonprovisional patent application Ser. No. 16/579,571, entitled "Wheel Alignment Mechanism," having the same inventors as the subject application and filed on the same date as the subject application, are hereby incorporated by reference as if fully set forth herein, particularly including the disclosure of the wheel alignment mechanism found for example at paragraphs 28-44 and in FIGS. 1A-1D and 2A-4.

FIG. 1A additionally shows a wheel hub 210, on which is to be mounted wheel mounting studs, a brake mechanism and a wheel. Wheel hub 210 includes two ball joints 211, shown in FIG. 2, that are received in lower sleeve 115 and upper sleeve 125. Either vertical movement of a wheel hub 210 relative to chassis 15, or vertical movement of chassis 15 relative to wheel hub 210 in the region proximate to hub 210, causes angular rotation of control arms 101, 102 relative to chassis 15. A steering rack 220 provides driver-initiated steering movements to the hub assemblies 210.

Figure 3A:
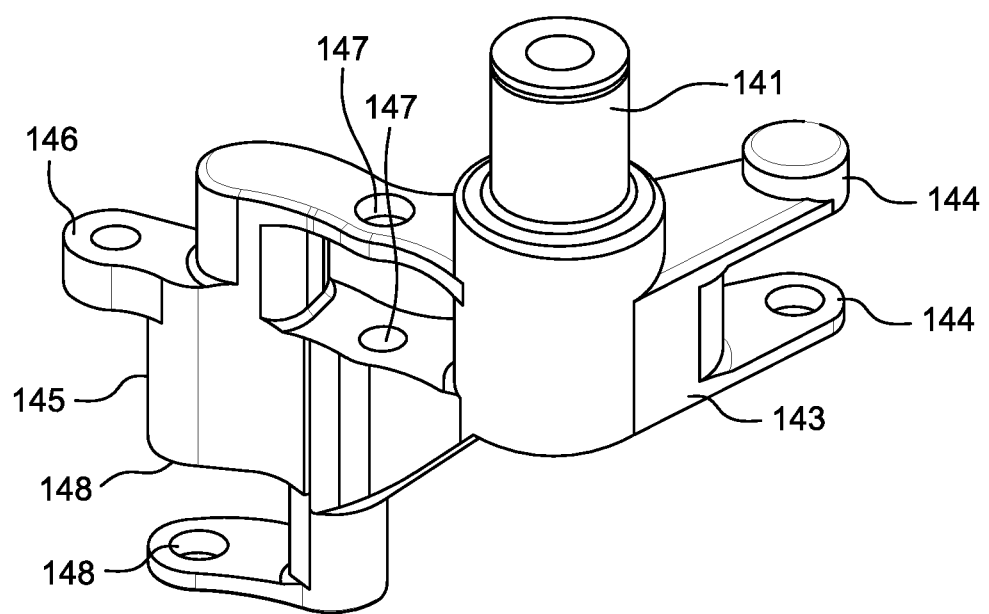
FIG. 3A is a perspective view of the bell crank of the present invention.
Figure 3B:
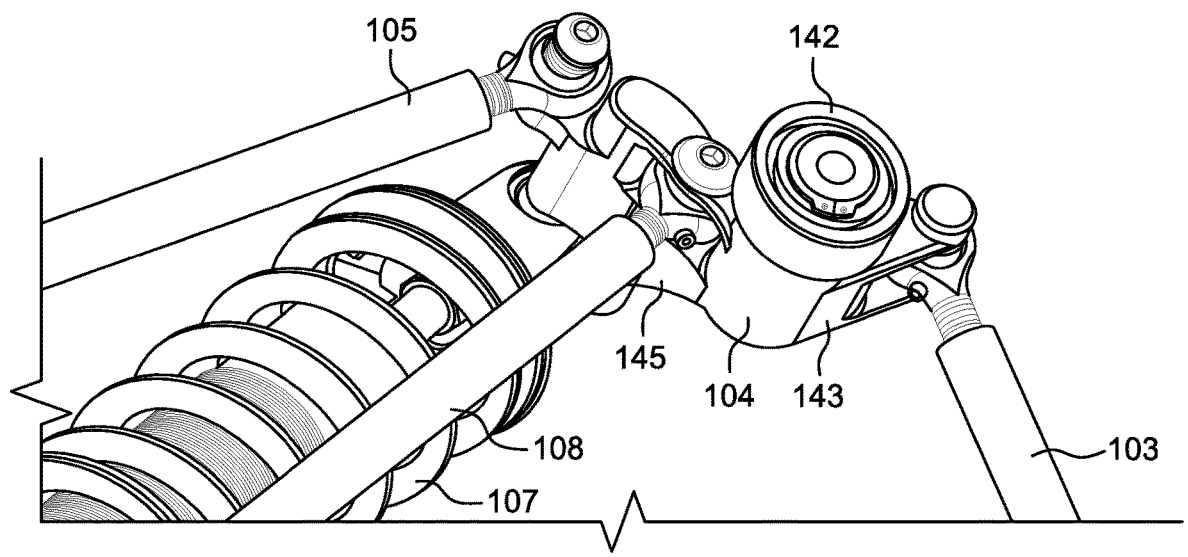
FIG. 3B is a perspective view showing the connections made to the bell crank of the present invention.

Each side of suspension 100 includes a main pushrod 103 and a bell crank 104, as shown in FIGS. 2 and 3B. Main pushrod 103 connects lower control arm 101 to bell crank 104. In particular, the lower end of main pushrod 103 has an eyelet, through which is passed a bolt or pin that is received in a trunnion mount 114 (see FIGS. 2 and 4) positioned on lower control arm 101 proximate apex portion 112, to form a revolute joint that secures the lower end of main pushrod 103 to lower control arm 101.

Bell crank 104 is provided with a shaft 141 on which is mounted a bearing 142 (shown in FIG. 3B), such as a roller bearing, that in turn is secured to the vehicle chassis 15 to permit the rotation of shaft 141. More particularly, bearing 142 preferably is fitted into bearing anchor 250, and bearing anchor 250 is secured to upper side tubular member 19. Bearing anchor 250 is shown in FIG. 2 and described further below.

As shown in FIG. 3A, bell crank 104 is provided with a first arm 143 and a second arm 145. First arm 143 includes two opposed main pushrod tangs 144. Second arm 145 includes a heave pushrod tang 146, two opposed anti-roll pushrod tangs 147 and two opposed shock absorber tangs 148. A bolt or pin connector is positioned through an eyelet in the upper end of main pushrod 103 and received in main pushrod tangs 144 to form a revolute joint that secures main pushrod 103 to bell crank 104.

Each side of suspension 100 is provided with a coil over shock absorber 107 positioned in a generally longitudinal orientation between the chassis 15 and bell crank 104, as shown for example in FIGS. 1A and 2. The spring portion of coil over shock absorber 107 is a helical spring encircling the damping components, which spring provides a resistive force that is proportional to the displacement of the spring from its relaxed state. The use of a coil over shock absorber is preferred in order to combine in one compact package spring and damping responses to loads.

As depicted in the embodiment shown in FIG. 1A, the forward end of shock absorber 107 is provided with an eyelet for securing shock absorber 107 to chassis 15. More particularly, the forward end of shock absorber 107 is secured to upright tubular member 25, preferably utilizing for this purpose a general purpose anchor 260, as shown in FIG. 2, and described further below. The actuating rod located at the rearward end of shock absorber 107 is provided with an eyelet, through which is passed a bolt or pin that is received in shock absorber tangs 148 to form a revolute joint fixing shock absorber 107 to second arm 145.

Accordingly, each side of suspension 100 in this disclosure is provided with a load-bearing component assembly embracing the following load-bearing components: lower control arm 101, upper control arm 102, the spring portion of coil over shock absorber 107 and wheel hub 210.

Each side of suspension 100 further includes an anti-roll pushrod 108, shown in FIGS. 1A and 2, positioned in a generally longitudinal direction approximately parallel to shock absorber 107 in the embodiment depicted in the figures. A bolt or pin connector is positioned through an eyelet at the rearward end of anti-roll pushrod 108 and received in opposed tangs 147 of bell crank 104 to form a revolute joint securing anti-roll pushrod to bell crank 104.

Suspension 100 further includes a heave spring assembly 106. Heave spring assembly 106 has the general configuration of an elongate rectangular bar. In its preferred position, heave spring assembly 106 is transversely oriented along its length, positioned generally in the horizontal plane, as shown in FIG. 1A, and more preferably is secured to chassis 15 closely positioned adjacent a transverse structural member of chassis 15.

Figure 4:
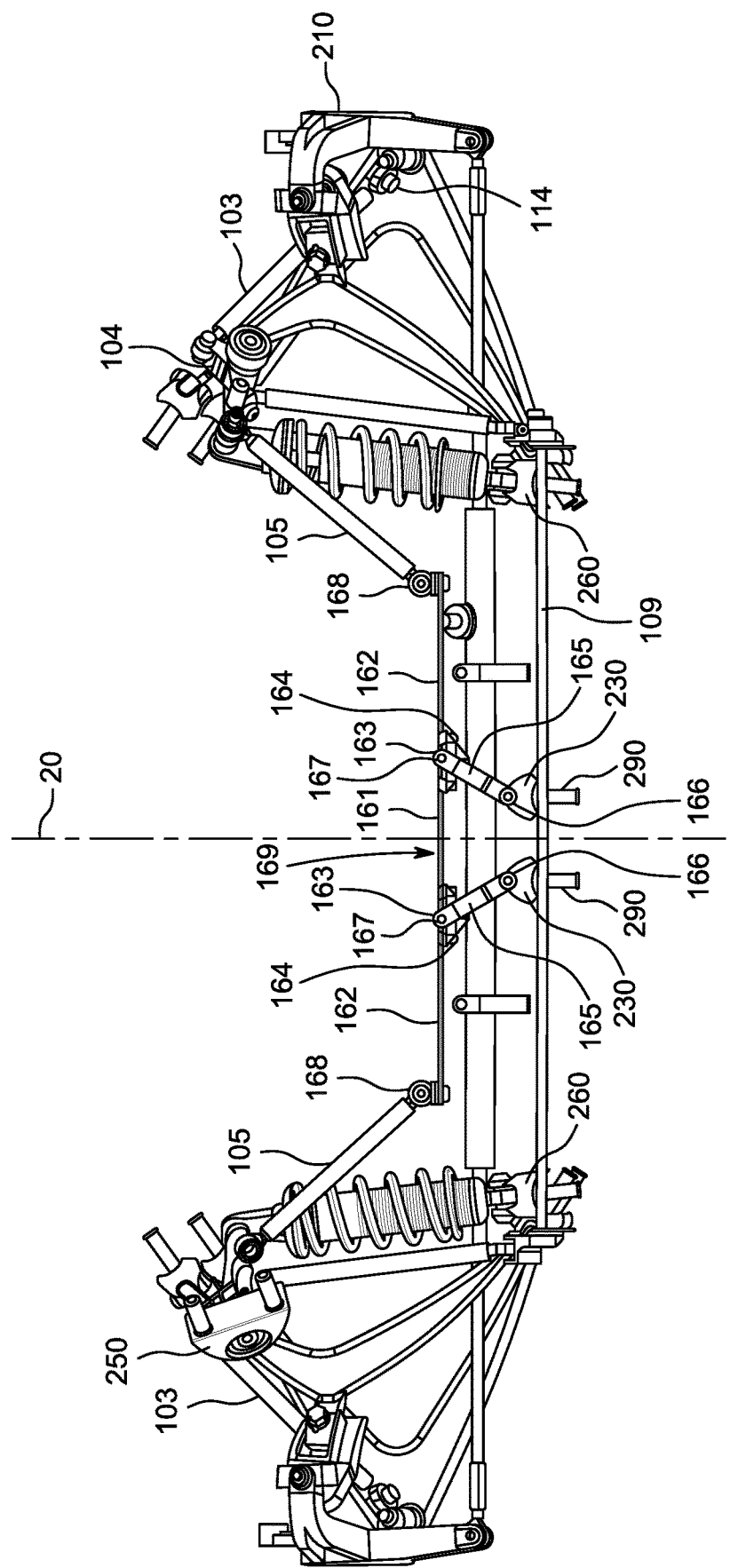
FIG. 4 is a top view of the suspension of the present invention, with the load-bearing component assemblies in their rest state.

Referring to FIGS. 1A and 4, heave spring assembly 106 is formed from three sections, center section 161 and two outer sections 162. The inboard end of each outer section 162 (the ends more proximal to plane 20, which is shown edgewise in FIG. 4) is secured with a hinge component 163 to an outboard end of center section 161, as shown in FIGS. 1A and 4. Each hinge component 163 is provided with a stopper 164 that limits the rotation of each outer section 162 relative to center section 161 to approximately 180°. As a result, with center section 161 of spring assembly 106 secured to chassis 15, spring assembly 106 exhibits directionally-dependent resiliency, meaning that it will act as a cantilever spring to resist equal end forces applied to assembly 106 in one direction, but not the other. In the case of a heave spring assembly 106 positioned and secured as shown in FIG. 1A, assembly 106 will act as a cantilever to resist end forces applied in a forward direction, but will not resist end forces applied in a rearward direction. Instead in the latter case, each outer section 162 will rotate about its respective hinge component 163 relative to center section 161.

Referring to FIG. 4, each hinge component 163 is secured to vehicle chassis 15 with a connecting link 165. The forward end of each connecting link 165 is secured to upper cross member 24 of chassis 15 preferably utilizing a general purpose anchor 230, as shown in FIGS. 2 and 4, having a first heave spring revolute joint 166. The other end of each link 165 (the rearward end, in the case of the embodiment shown in the drawings) is secured to hinge component 163 with a second heave spring revolute joint 167.

As a result, the two connecting links 165, the portion of upper cross member 24 positioned between them, and the center section 161, form a planar four bar quadrilateral linkage 169. The two connecting links 165 have the same lengths, or approximately so. As shown in FIG. 4, the distance separating the revolute joints 166 that fasten the connecting links to upper cross member 24 of chassis 15 is less than the distance separating the revolute joints 167 that fasten the connecting links 165 to center section 161 of heave spring assembly 106, such as to form an isosceles trapezoid configuration. The consequences of this configuration is that when one end of heave spring assembly 106 is urged in the forward direction, the assembly 106 will both rotate correspondingly, and also be displaced, as shown for example in FIG. 11 (discussed further below).

Each side of suspension 100 additionally includes a heave pushrod 105, which, via a bell crank 104 and a main pushrod 103, couples the left or right side (as the case may be) of heave spring assembly 106 to the load-bearing component assembly positioned on the corresponding side of chassis 15. Heave pushrod 105 includes two eyelets, one at each end. A bolt or pin is passed through one of the eyelets and is received in pushrod tang 146, thereby forming a revolute joint between heave pushrod 105 and bell crank 104. A bolt or pin is passed through the other of the eyelets and is received in a trunnion mount 168 positioned proximate to the end of each of outer sections 161, to provide a revolute joint between heave pushrod 105 and heave spring assembly 106.

Suspension 100 additionally includes an anti-roll torsion bar 109, shown in FIGS. 1A and 2, which is transversely oriented on vehicle chassis 15, and which is preferably contained within upper cross member 24. Each end of anti-roll torsion bar 109 is provided with a lever arm 191 (see FIG. 1A) having two opposed tangs which receives an eyelet on the forward end of anti-roll pushrod 108. A bolt or pin is positioned through apertures in each of the opposed tangs to form a revolute joint that secures antiroll pushrod 108 to anti-roll torsion bar 109.

The components of suspension 100 preferably are secured to chassis 15 in the preferred embodiment utilizing general purpose anchors 230 and 260, and bearing anchor 250. Also, in the case of utilization of suspension 100 mounted to the rear of vehicle 10 in the preferred embodiment, a tangential load anchor 270 can be utilized in connection with shock absorber mounting. The structure and operation of these anchors are described separately below. Details regarding anchors and supporting elements utilizable in connection with suspension 100 herein are disclosed in U.S. Provisional Application 62/735,966 entitled "Chassis Anchoring Systems," filed on Sep. 25, 2018 and naming the same inventors as the subject application; the contents of that "Chassis Anchoring Systems" application relating to such anchors and supporting elements are hereby incorporated by reference into the present disclosure as if fully set forth herein. Further, details regarding anchors and supporting elements utilizable in connection with suspension 100 herein can also be found in U.S. Nonprovisional patent application Ser. No. 16/579,554, entitled "Chassis Anchoring Systems", naming the same inventors as the subject application and filed on the same date as the subject application, the contents of which are hereby incorporated by reference as if fully set forth herein, particularly including the disclosure relating to anchoring systems used to secure suspension components to an exoskeleton/space frame for example and to load-bearing components generally, found for example at paragraphs 38-68 and in FIGS. 2A-6.

General Purpose Anchor (Two Position) (230)

Figure 5A:
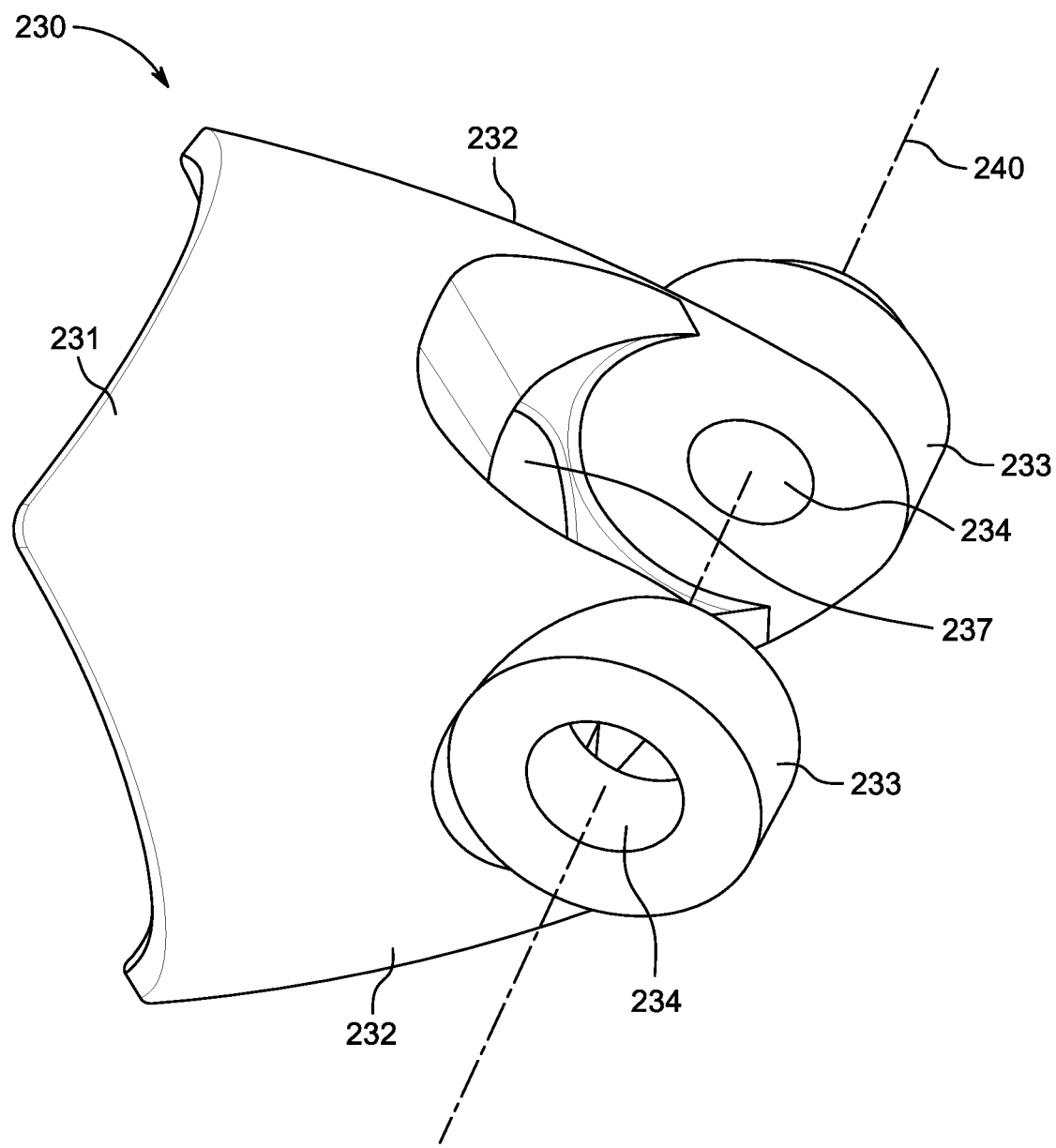
FIG. 5A is a forward perspective view of a two position general purpose anchor in accordance with the present invention.

General purpose anchor 230, a forward perspective view of which is shown in FIG. 5A, includes a base 231 from which extends two spaced-apart opposed cheek members 232 whose ends distal from base 231 are provided with circular mounts 233. Mounts 233 are each provided with annular apertures 234, which have a centerline 240, and through which a rod end joint or other vehicle component can be secured with a threaded bolt. An integral locking nut 235 (FIG. 5B) is optionally provided on the exterior face of one of the mounts 233 to facilitate securing the threaded bolt to anchor 230.

Figure 5B:
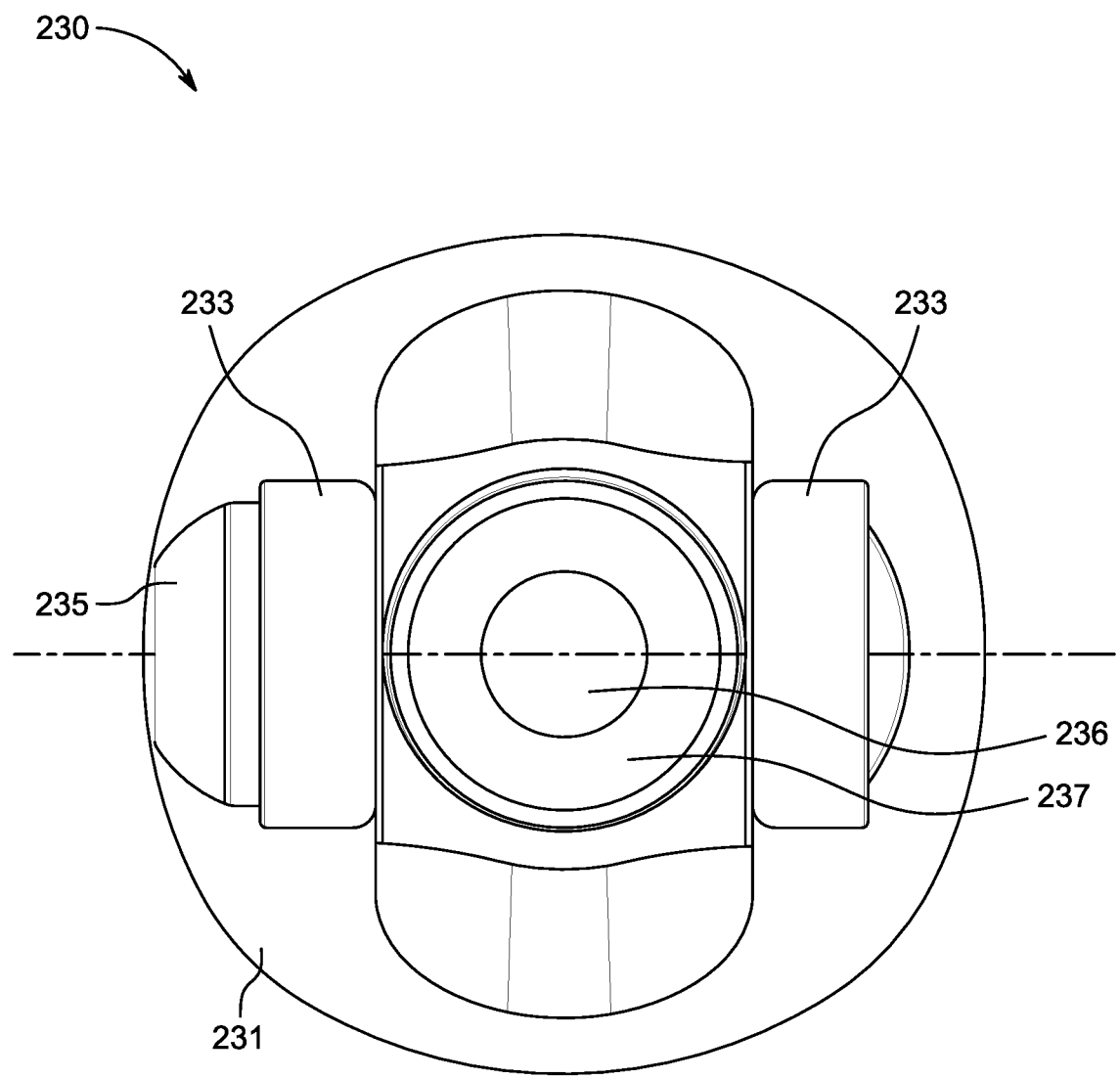
FIG. 5B is a top view of a two position general purpose anchor in accordance with the present invention.

Referring to FIG. 5B, the base 231 of anchor 230 is provided with a mounting aperture 236 through which a removable fastener 295 can be placed to secure general purpose anchor 230 to a tubular member of vehicle chassis 15, preferably utilizing the Securing Elements described further below. There is further provided an annular recess 237 in base 231 to receive a head of fastener 295.

Figure 5C:
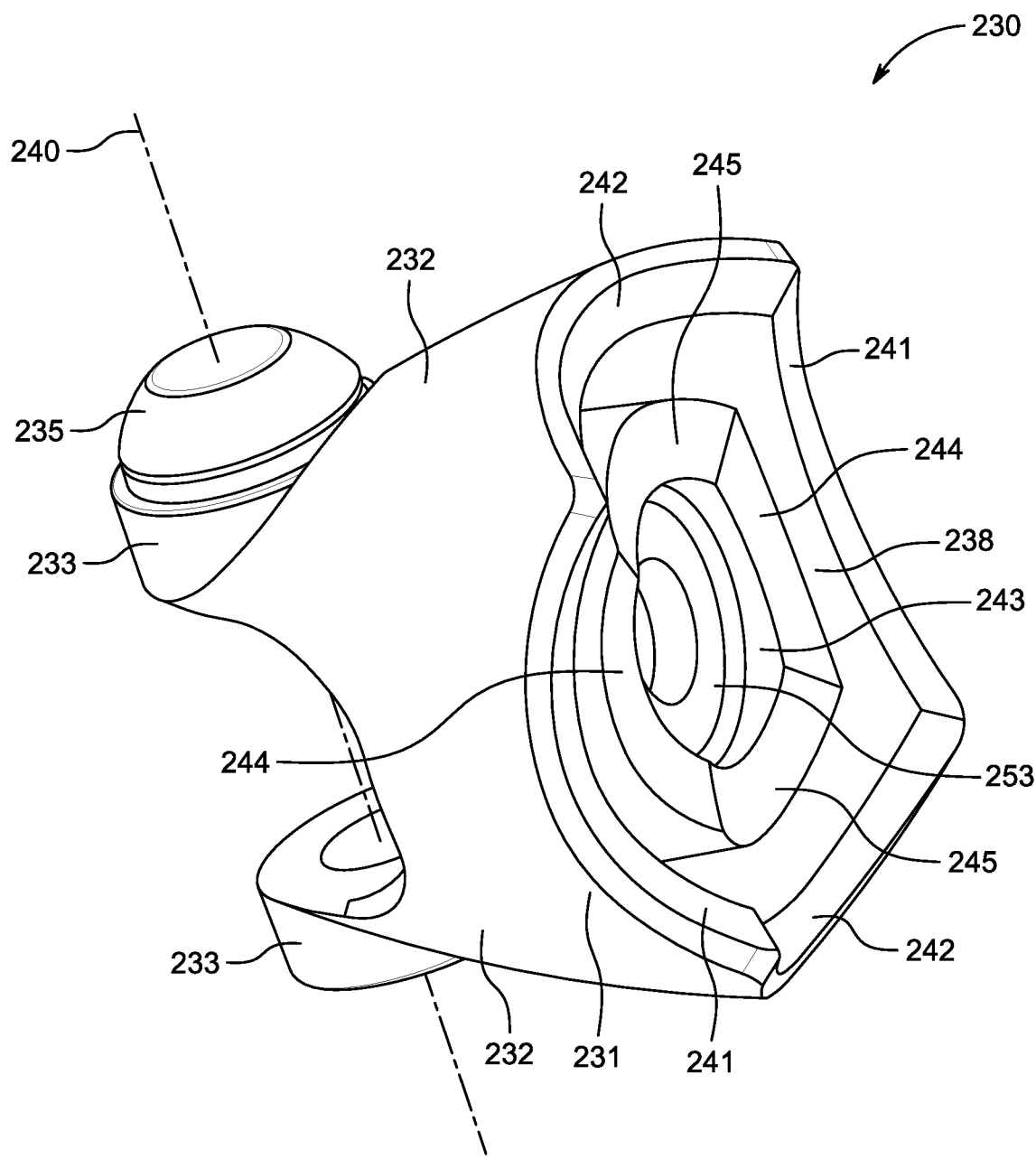
FIG. 5C is a rearward perspective view of a two position general purpose anchor in accordance with the present invention.
Figure 5D:
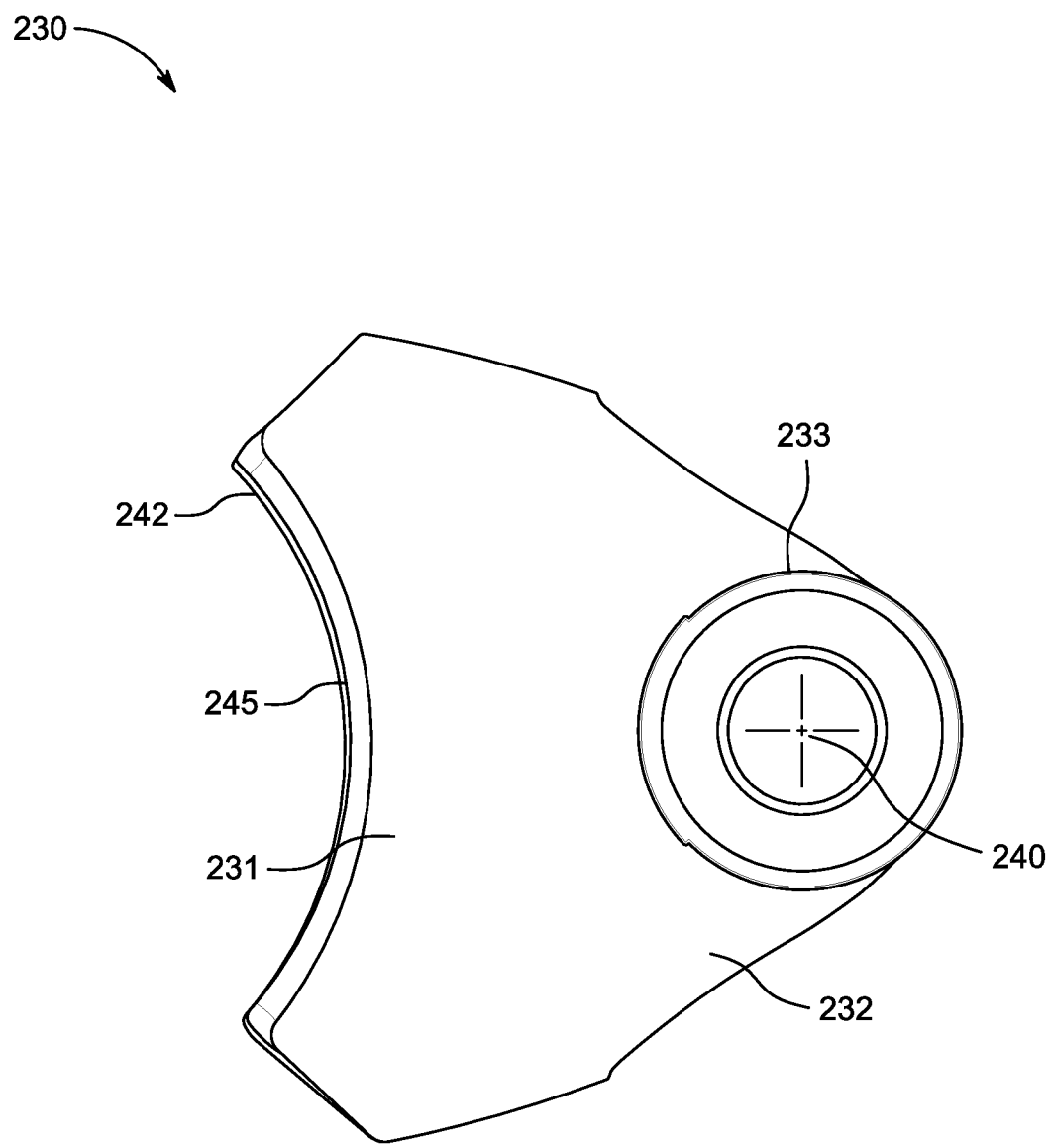
FIG. 5D is a side view of a two position general purpose anchor in accordance with the present invention.
Figure 5E:
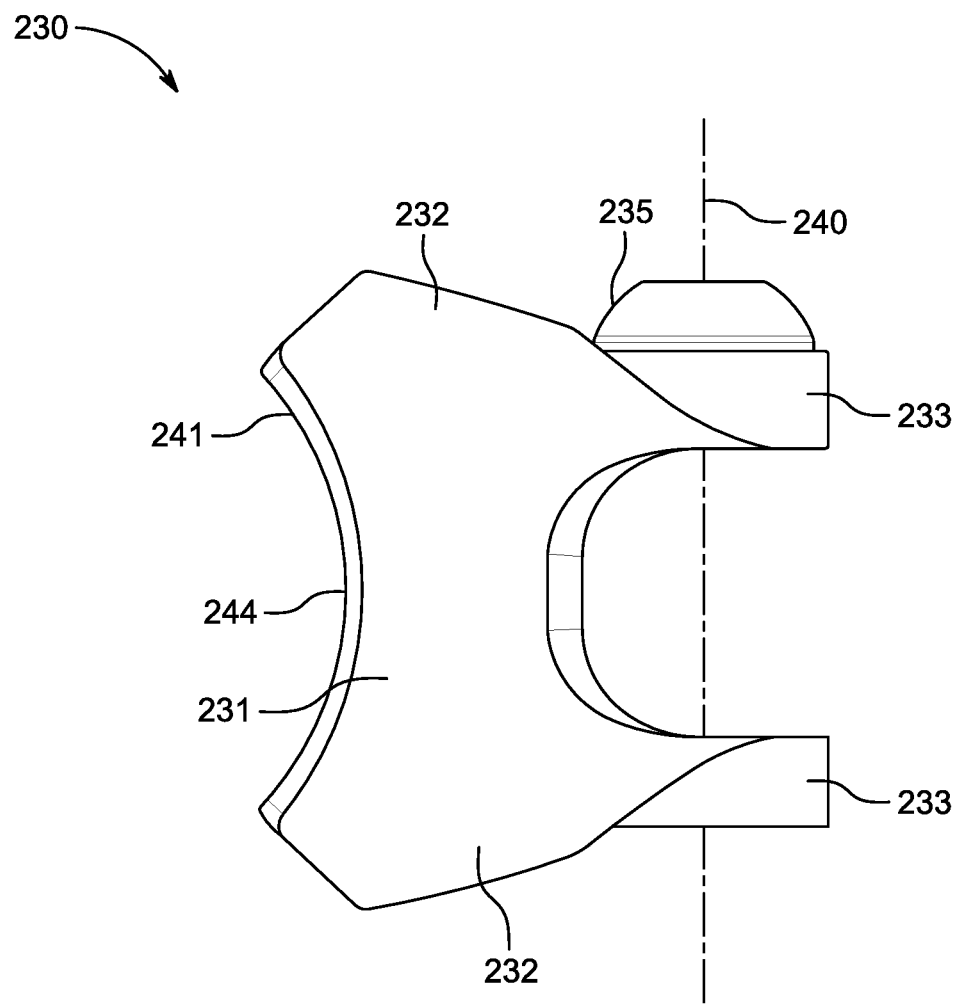
FIG. 5E is a front view of a two position general purpose anchor in accordance with the present invention.
Figure 5F:
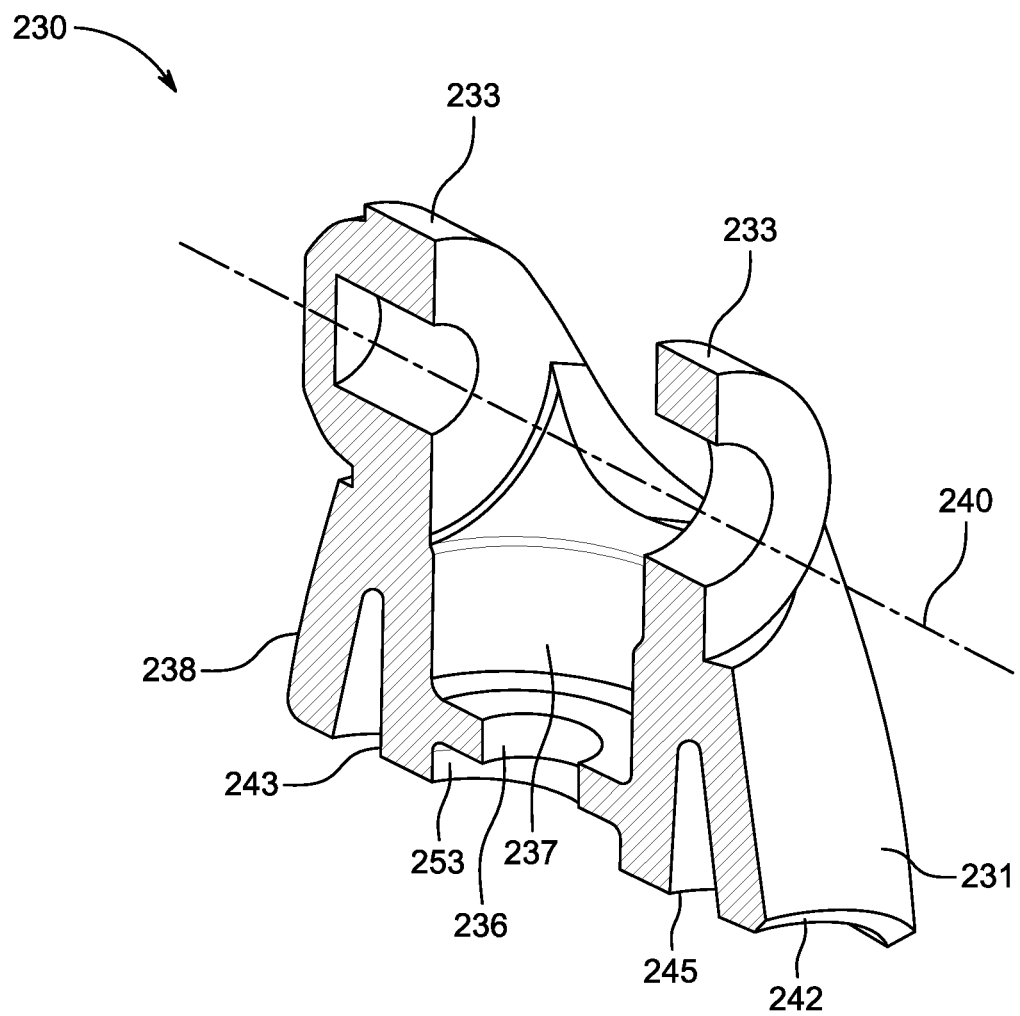
FIG. 5F is a perspective sectional view of a two position general purpose anchor in accordance with the present invention.

The portions of base 231 contacting the tubular member of chassis 15 against which anchor 230 is positioned (the "contact elements") are curved to conform to the shape of that tubular member. In particular, base 231 has a load-bearing exterior skirt 238 as shown in FIGS. 5C and 5F, which is to be placed in contact with a tubular member of chassis 15 having a circular cross-section. Exterior skirt 238 terminates with two pairs of concavely shaped spaced-apart opposed arcuate cut-outs 241 and 242, each pair perpendicular to the other and having a curvature that generally conforms to the outside diameter of the tubular member to which anchor 230 is secured. Base 231 also includes a load-bearing interior skirt 243, circumscribed by exterior skirt 238, which terminates with two pairs of concavely shaped spaced-apart opposed arcuate cut-outs 244 and 245, each pair perpendicular to the other and having a curvature that generally conforms to the outside diameter of the tubular member to which anchor 230 is secured.

Skirts 238 and 243 preferably are dimensioned to be approximately in flush contact with the exterior surface of a tubular member when anchor 230 is positioned against the tubular member. Exterior skirt 238 and interior skirt 243 each has a thickness and construction to be able to bear compressive loads which are primarily imposed upon it by fastener 295 and from other vehicle components through mounts 233 and cheek members 232.

The provision of two pairs of cut-outs 241 and 242 on exterior skirt 238 and two pairs of cut-outs 244 and 245 on interior skirt 243 facilitates positioning anchor 230 in two different orientations: a first orientation where centerline 240 is generally parallel to the axis of the tubular member on which it is mounted, and a second orientation where centerline 240 is rotated approximately 90° from the first orientation to be generally perpendicular to the axis of the tubular member on which it is mounted. This permits orienting the mounts 233 and their apertures 234 in accordance with the alignment of the fastening points of the vehicle component at issue.

General Purpose Anchor (One Position) (260)

Figure 5G:
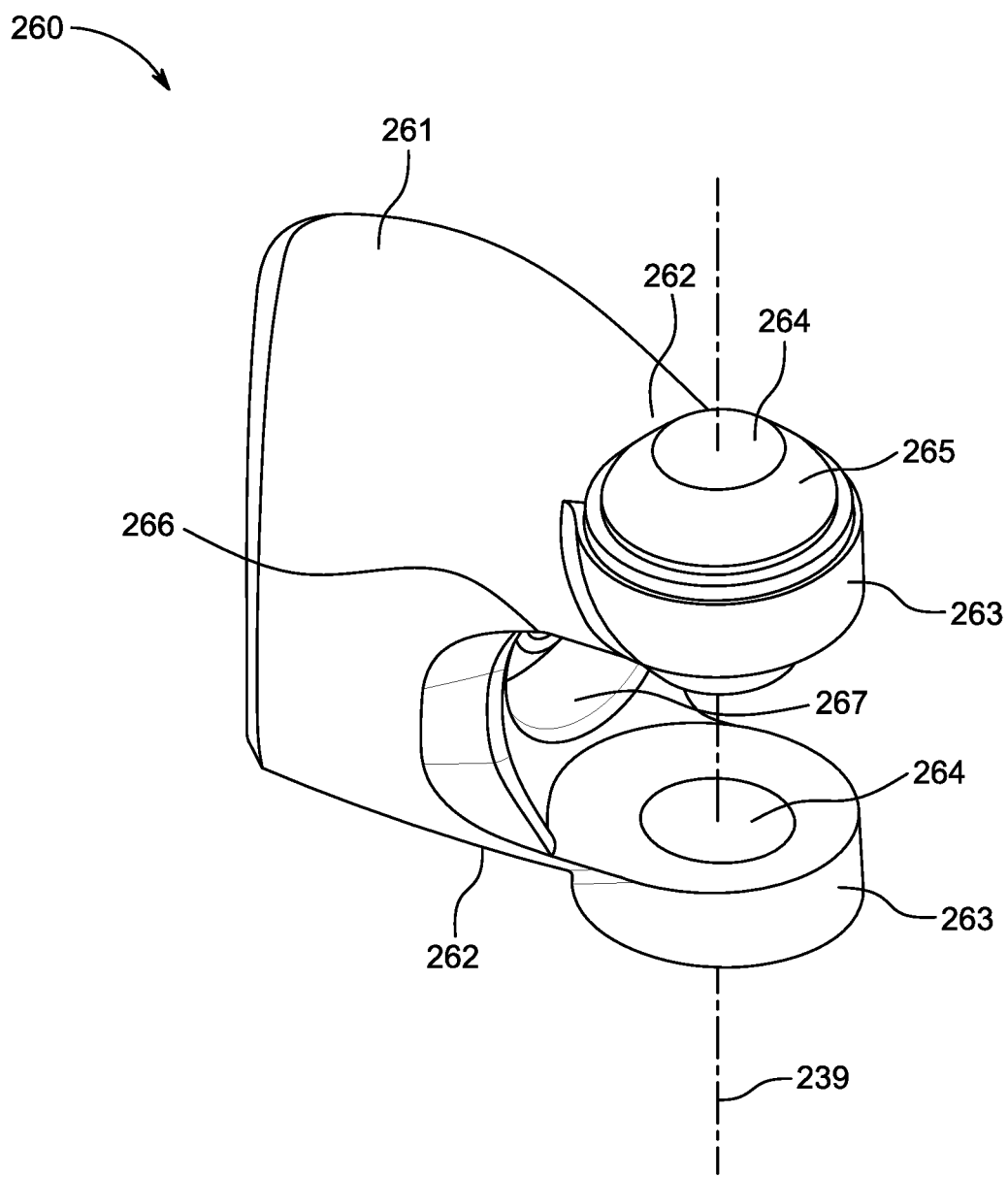
FIG. 5G is a perspective view of a one position general purpose anchor in accordance with the present invention.

General purpose anchor 260, a forward perspective view of which is shown in FIG. 5G, is similar to general purpose anchor 230, except that anchor 260 is designed to be used in one orientation only.

Figure 5H:
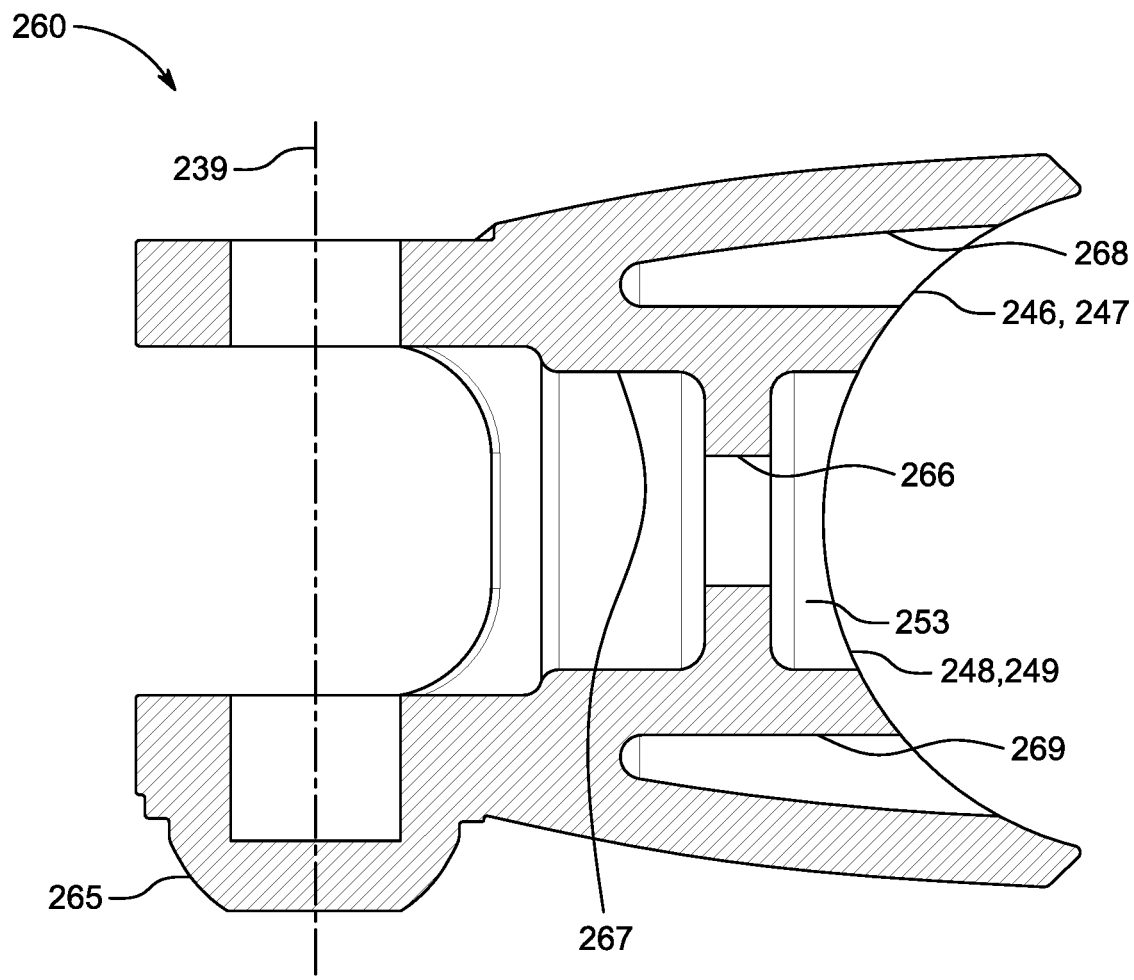
FIG. 5H is a front sectional view of a one position general purpose anchor in accordance with the present invention

As shown in FIGS. 5G and 5H, general purpose anchor 260 includes a base 261 from which extends two spaced-apart opposed cheek members 262 whose ends distal from base 261 are provided with circular mounts 263. Mounts 263 are each provided with annular apertures 264, which have a centerline 239, and through which a rod end joint or other vehicle component can be secured with a threaded bolt. An integral locking nut 265 is optionally provided on the exterior face of one of the mounts 263 to facilitate securing the threaded bolt to anchor 260.

Referring to FIGS. 5G and 5H, the base 261 of anchor 260 is provided with a mounting aperture 266 through which a removable fastener 295 can be placed to secure general purpose anchor 260 to a tubular member of chassis 15, preferably utilizing the Securing Elements described further below. There is further provided an annular recess 267 in base 261 to receive a head of fastener 295.

The contact elements of base 261 are curved to conform to the shape of the tubular member of chassis 15 against which anchor 260 is positioned. In particular, base 261 has a load-bearing exterior skirt 268 as shown in FIG. 5H, which is to be placed in contact with a tubular member of chassis 15 having a circular cross-section. Exterior skirt 268 terminates with one pair of concavely shaped spaced-apart opposed arcuate cut-outs 246 and 247, each having a curvature that generally conforms to the outside diameter of the tubular member to which anchor 260 is secured. Base 261 also includes a load-bearing interior skirt 269, circumscribed by exterior skirt 268, which terminates with one pair of concavely shaped spaced-apart opposed arcuate cut-outs 248 and 249, each having a curvature that generally conforms to the outside diameter of the tubular member to which anchor 260 is secured.

Skirts 268 and 269 are dimensioned to be approximately in flush contact with the exterior surface of a tubular member when anchor 260 is positioned against the tubular member. Exterior skirt 268 and interior skirt 269 each has a thickness and construction to be able to bear compressive loads which are primarily imposed upon it by fastener 295 and from other vehicle components through mounts 263 and cheek members 262.

As illustrated, the distance between centerline 239 and the contact elements of base 261 (of anchor 260) are greater than between centerline 240 and the contact elements of base 231 (of anchor 230). Thus general purpose anchor 260 provides more clearance above the tubular member on which it is mounted than general purpose anchor 230. In the embodiment of general purpose anchor 260 shown, the centerline 239 of circular mounts 263 is generally perpendicular to the axis of the tubular member on which anchor 260 is mounted. However, it is also possible to orient arcuate cut-outs 246-249 so that centerline 239 is generally parallel to the axis of the tubular member on which anchor 260 is mounted, in accordance with design preference.

Bearing Anchor (250)

Figure 6A:
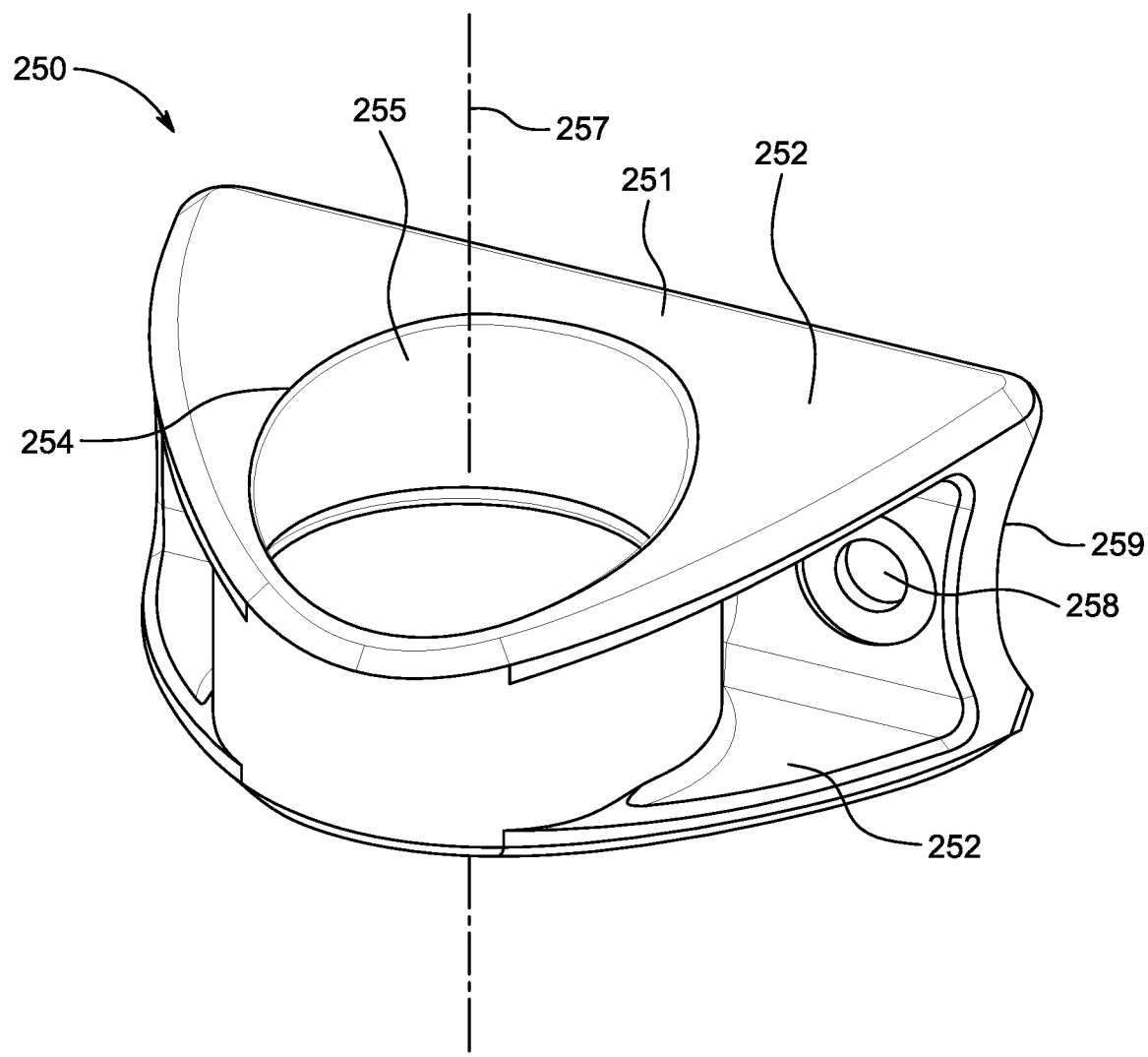
FIG. 6A is a perspective view of a bearing anchor in accordance with the present invention.
Figure 6B:
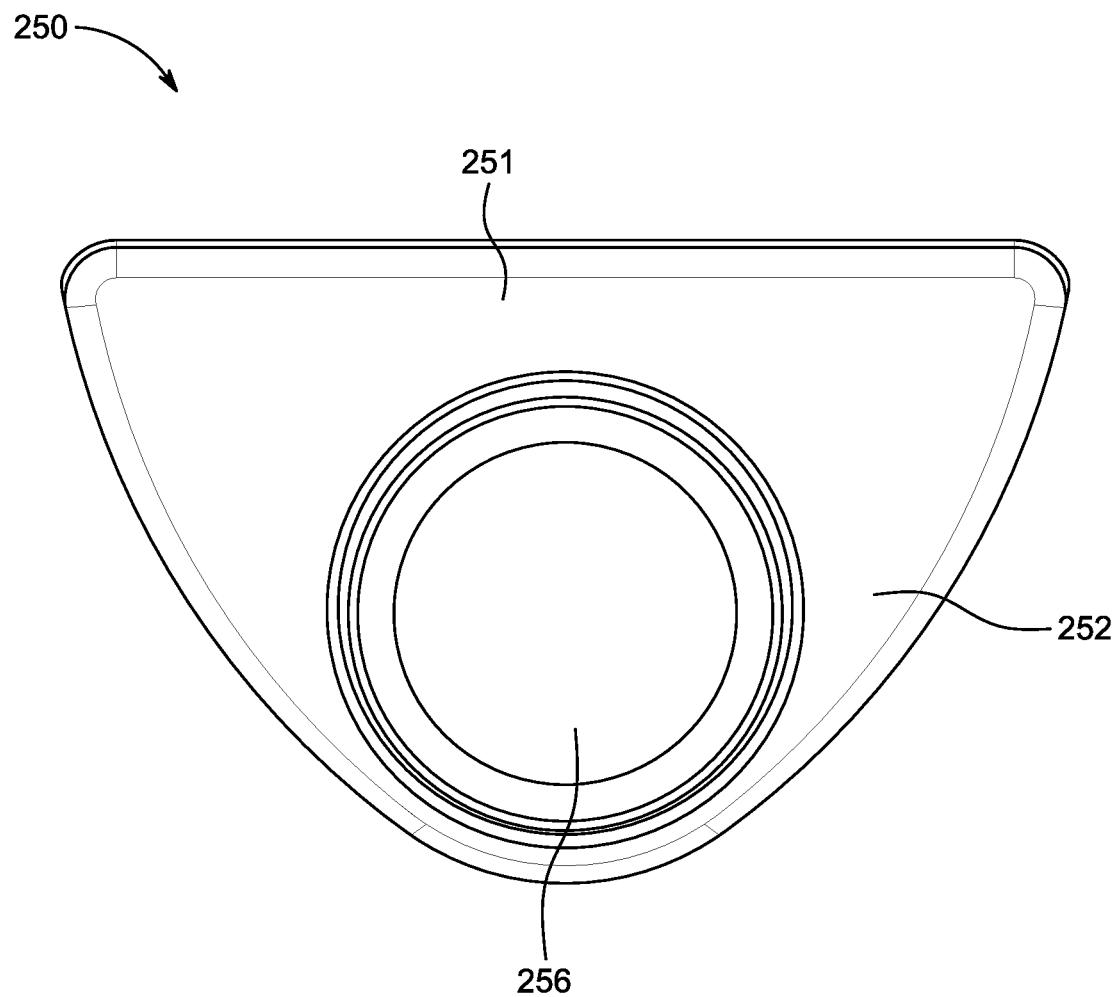
FIG. 6B is a front view of a bearing anchor in accordance with the present invention.
Figure 6C:
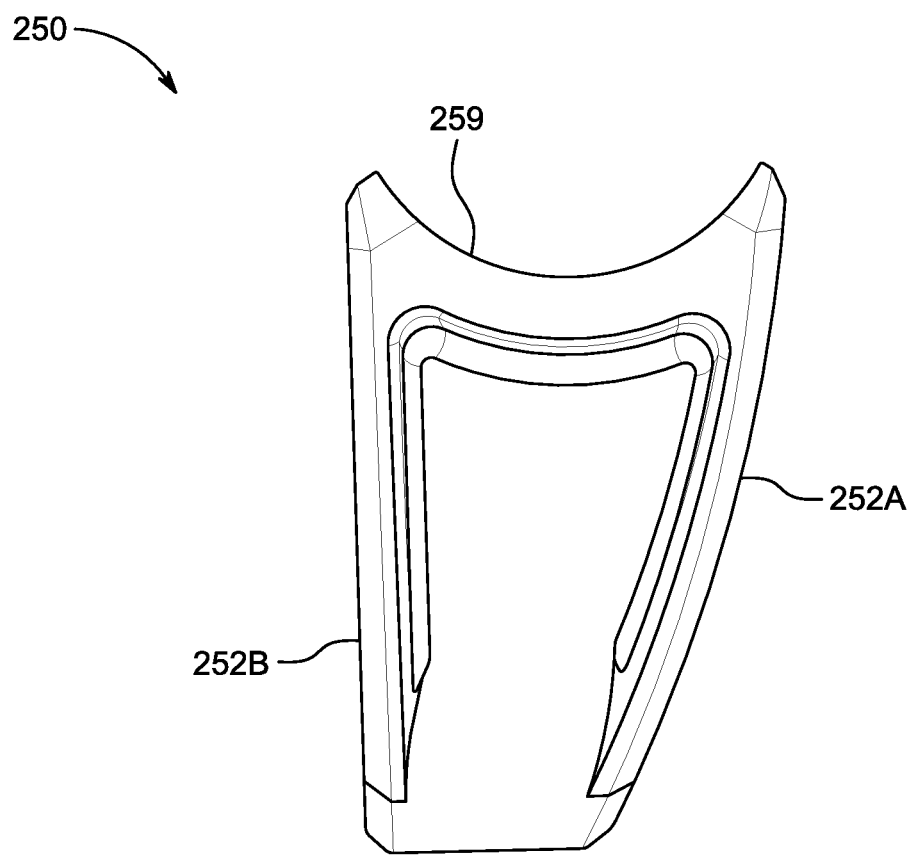
FIG. 6C is a side view of a bearing anchor in accordance with the present invention.
Figure 6D:
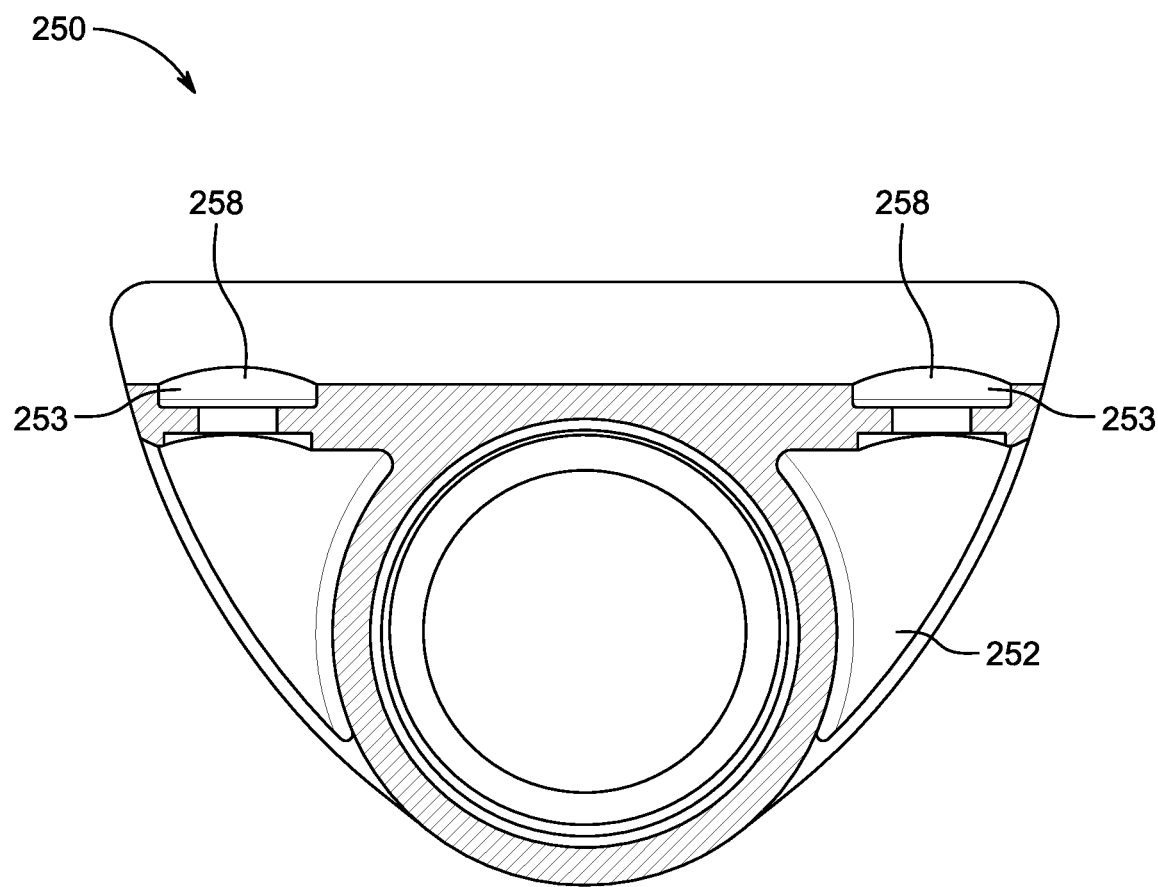
FIG. 6D is a front sectional view of a bearing anchor in accordance with the present invention.

Bearing anchor 250, a perspective view of which is shown in FIG. 6A, includes a base 251 from which extends two opposed spaced-apart crescent-shaped cheek plates 252, which are each provided with an annular aperture 254. The apertures 254 are joined by a cylindrical shroud 255 to define a closed through-recess 256, having a centerline 257, into which bearing 142 can be press-fitted or otherwise secured therein. Referring to FIGS. 6A and 6D, the base 251 of bearing anchor 250 is provided with two spaced-apart mounting apertures 258 into which removable fasteners 295 can be placed to secure bearing anchor 250 to a tubular member of chassis 15, preferably utilizing the Securing Elements described further below.

The shape of the contact elements of base 251 are curved for use in connection with tubular members of chassis 15 having a circular cross-section. More particularly, base 251 includes a concave load-bearing channel 259 having a curvature that generally conforms to the outside diameter of the tubular member of chassis 15 to which anchor 250 is secured. In the event that the width of shroud 255 (when measured along centerline 257) need not be as wide as the distance across channel 259, one of cheek plates 252 (denominated 252A in FIG. 6C) can be curved toward the other of cheek plates 220 (denominated 252B in FIG. 6C) as the distance from base 210 increases. Alternatively, both cheek plates 252 can be curved toward each other as the distance from base 210 increases, in accordance with design preference.

Tangential Load Anchor (270)

Figure 7A:
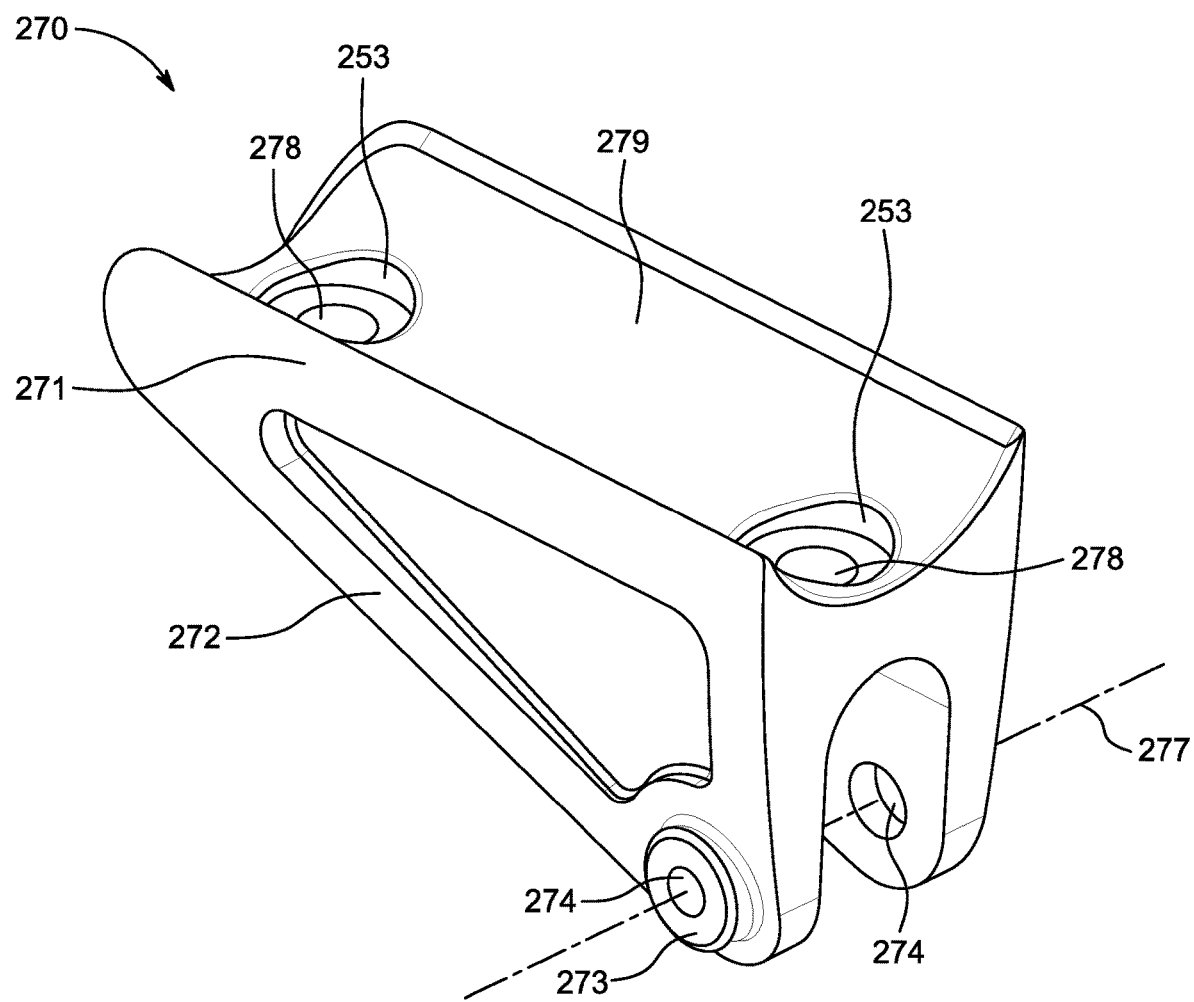
FIG. 7A is a perspective view of a tangential load anchor in accordance with the present invention.
Figure 7B:
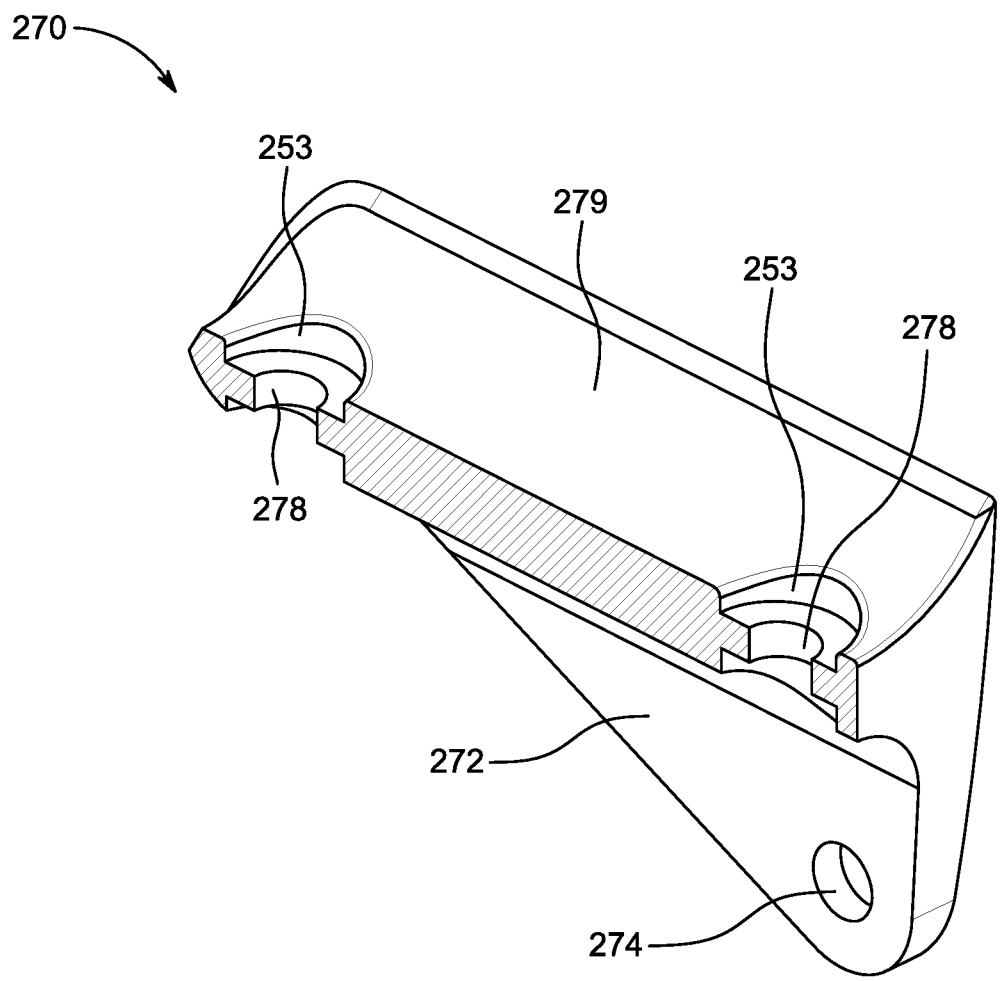
FIG. 7B is a perspective sectional view of a tangential load anchor in accordance with the present invention.
Figure 7C:
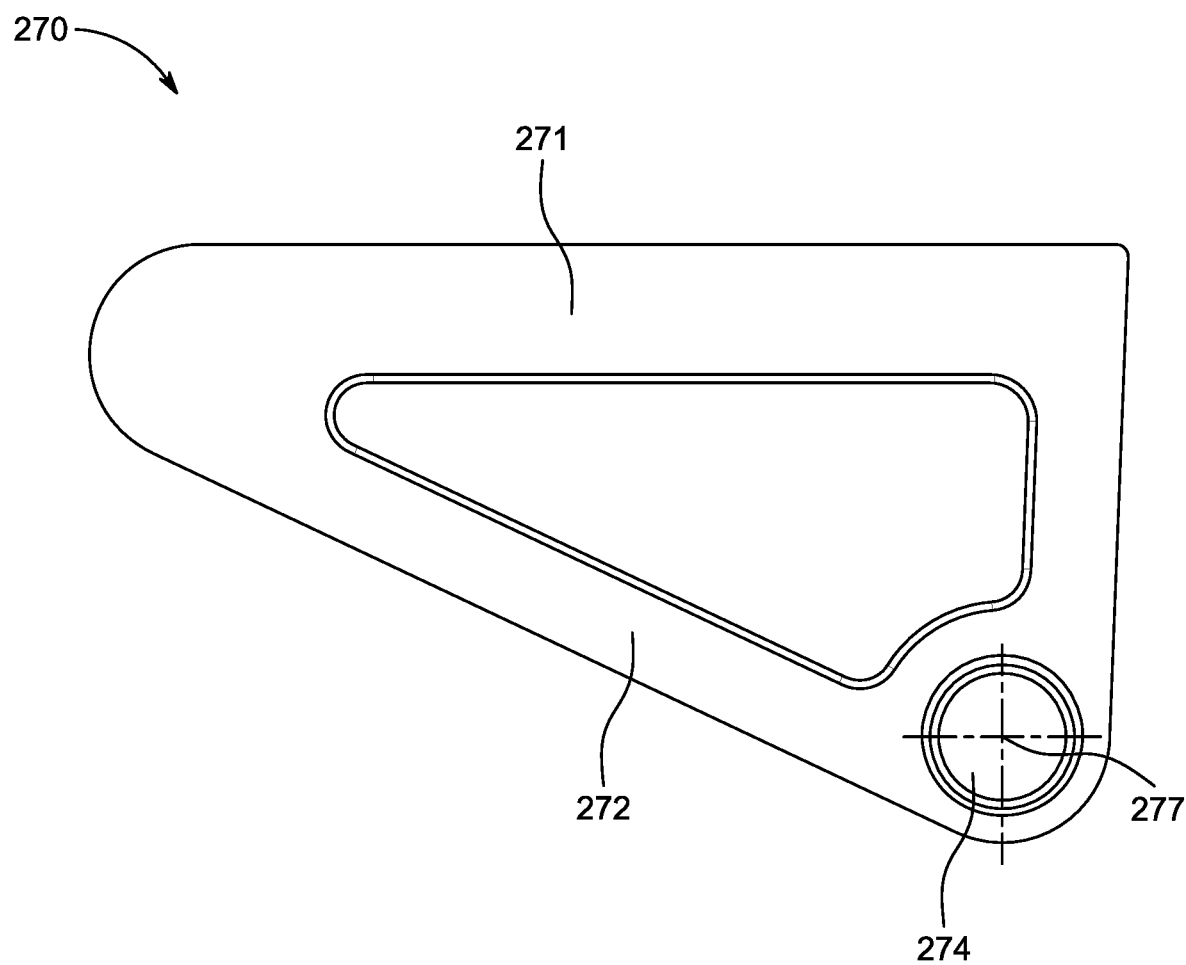
FIG. 7C is a front view of a tangential load anchor in accordance with the present invention.
Figure 7D:
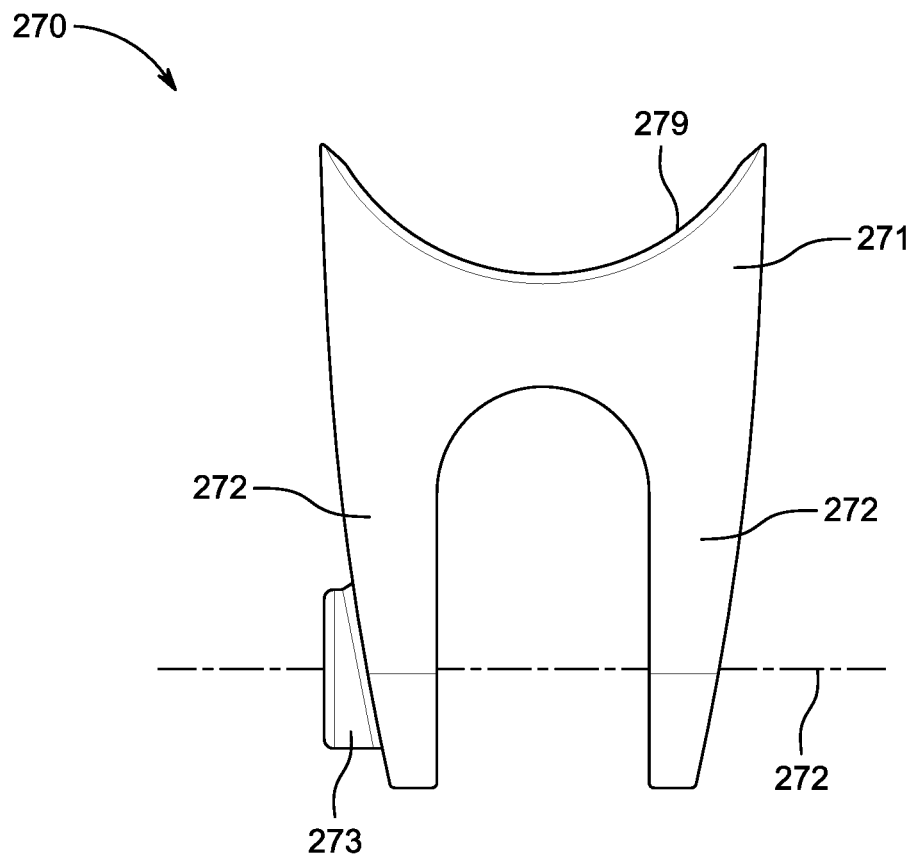
FIG. 7D is a side view of a tangential load anchor in accordance with the present invention.

Tangential load anchor 270, as shown in the perspective views of FIGS. 7A and 7B, includes a base 271 from which extends two spaced-apart opposed generally triangular cheek plates 272, shown for example in FIGS. 7C and 7D. The ends of plates 272 distal from base 271 are each provided with annular apertures 274, which have a centerline 277, and through which a rod end joint or other vehicle component can be secured with a threaded bolt. An integral locking nut 273 is optionally provided on the exterior face of one of the cheek plates 272 to facilitate securing the threaded bolt to anchor 270. Referring to FIGS. 7A and 7B, the base 271 of tangential load anchor 270 is provided with two spaced-apart mounting apertures 278 into which removable fasteners 295 can be inserted to secure tangential load anchor 270 to a tubular member of chassis 15, preferably utilizing the Securing Elements described further below.

The shape of the contact elements of base 271 are curved for use in connection with tubular members of chassis 15 having a circular cross-section. More specifically, base 271 includes a concave load-bearing channel 279 having a curvature, as shown for example in FIG. 7D, which generally conforms to the outside diameter of the tubular member of chassis 15 to which anchor 270 is secured.

Securing Elements

The elements used to secure any of anchors 230, 250, 260 and 270 to the tubular member of a vehicle chassis are described below with respect to general purpose anchor 230, although the description equally applies to anchors 250, 260 and 270 as well.

Figure 9:
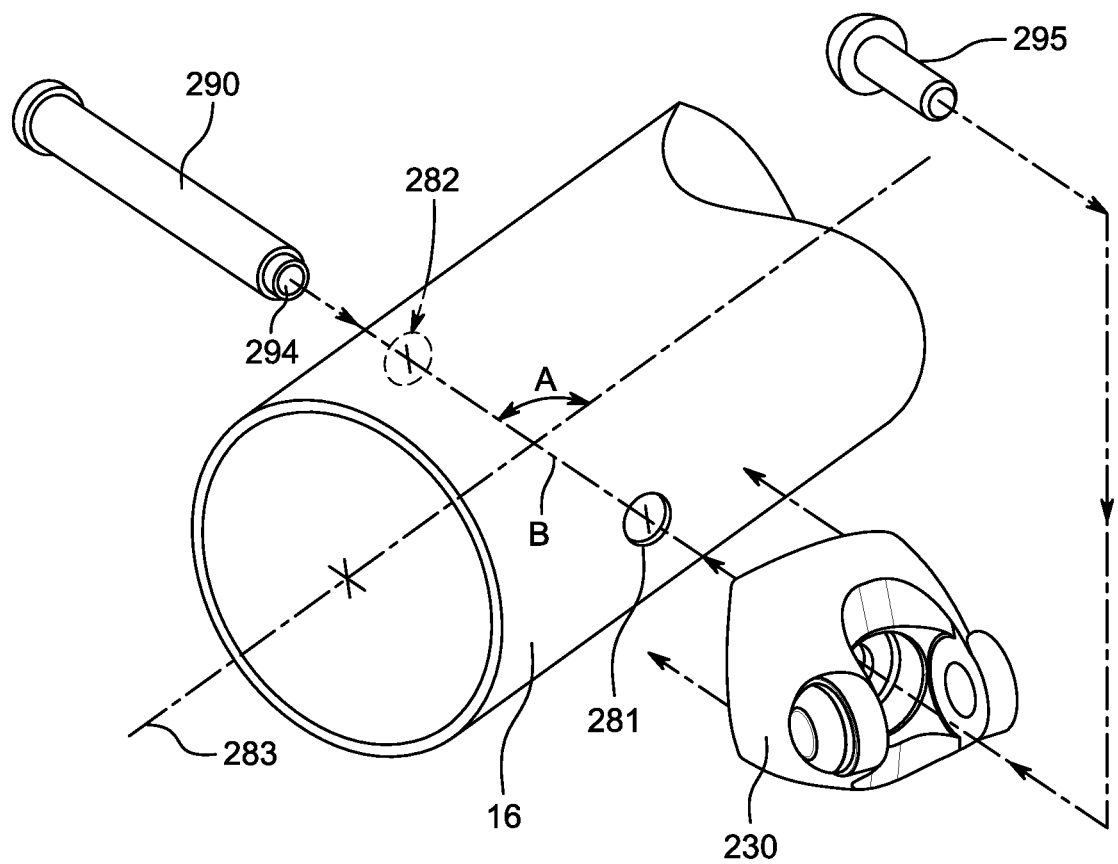
FIG. 9 shows a portion of a tubular member and the elements utilized to mount a general purpose anchor of the present invention to the tubular member.

To secure general purpose anchor 230 to exemplary tubular member 16, a portion of which is shown in FIG. 9, two opposed circular tube apertures 281, 282 are formed in tubular member 16. Apertures 281, 282 are generally orthogonal to the axial centerline 283 of member 16, as shown in FIG. 9 (Angle A is approximately 90°), and are located along a diameter B (FIG. 9) of tubular member 16.

Figure 8A:
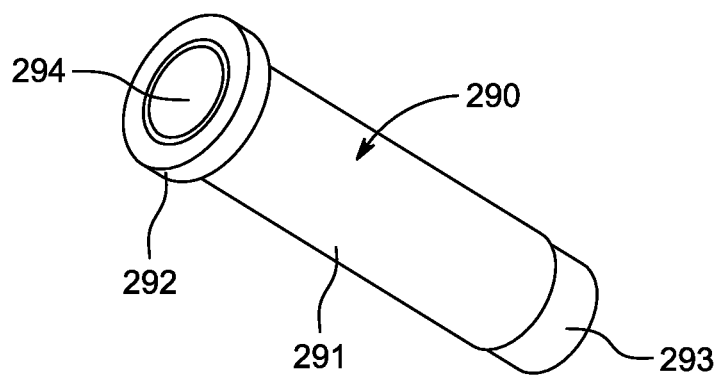
FIGS. 8A and 8B are perspective and front views of a boss in accordance with the present invention.
Figure 8B:
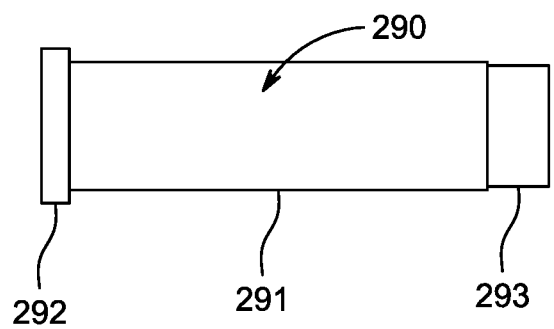

FIGS. 8A and 8B depict an anchor securing element, boss 290, which is a cylindrical member that is inserted through apertures 281, 282 shown in FIG. 9. Boss 290 has a shaft 291 that terminates in a flanged end 292. The length of shaft 291 extends through tubular member 16 when the flanged end 292 is positioned against the outer surface of tubular member 16. Preferably, countersinks 253 (see, e.g., FIGS. 5F, 5H, 6D and 7A) are provided so that anchors 230, 250, 260 and 270 can sit flush against the surface of tubular member 16 in the event the end of shaft 291 distal from flanged end 292 protrudes beyond the surface of tubular member 16 when boss 290 is inserted through apertures 281, 282.

The end of boss 290 distal from flanged end 292, stepped end 293, preferably has a reduced diameter as compared to the diameter of shaft 291 between flanged end 292 and stepped end 293, as depicted in FIGS. 8A and 8B. The diameter of tube aperture 281 in FIG. 9 preferably is smaller than the diameter of tube aperture 282. Further, it is preferred that the diameter of shaft 291 between flanged end 292 and stepped end 293 be greater than the diameter of tube aperture 281 and slightly less than the diameter of tube aperture 282, and it is preferred that the diameter of stepped end 293 be slightly less than the diameter of tube aperture 281.

In accordance with the foregoing design preferences, boss 290 is self-aligning; i.e., boss 290 can be inserted into apertures 281, 282 from one direction only, and only up to the point where flange 292 comes into contact with the surface of tubular member 16. Therefore, utilizing a self-aligning anchor securing element, which in the preferred embodiment is boss 290 with the design features disclosed herein, facilitates component assembly and provides a measure of quality control during component assembly.

In the preferred embodiment, boss 290 is welded in place to tubular member 16, at flanged end 292 and at stepped end 293, to fix it in place. Alternatively, boss 290 can be left unsecured to tubular member 16, relying on flanged end 292 to maintain it in proper position until the anchor/boss assembly is secured into place. In an alternative embodiment of boss 290, flanged end 292 and stepped end 293 are omitted, such that shaft 291 of boss 290 is of generally uniform diameter along its length. In conjunction with this alternative embodiment, apertures 281, 282 can have the same diameter, sized to received shaft 291. Boss 290 in this alternative embodiment can then be inserted into tubular member 16 through either of apertures 281, 282. Given the omission of flanged end 292 in this embodiment, it is preferable to permanently fix boss 290 in place, as by welds at one or both of apertures 281, 282

Boss 290 also has a bore 294 for receiving a fastener 295, such as a threaded bolt. Bore 294 can be threaded or smooth. If bore 294 is threaded, fastener 295 should be correspondingly threaded to permit fastener 295 to be secured tightly to boss 290. If bore 294 is smooth, fastener 295 should be of a length larger than the outside diameter of tube 16, such that when inserted in bore 294, the portion of fastener 295 protruding beyond tube 16 can be secured, such as by threading the protruding portion and securing it with a corresponding nut.

After boss 290 is placed in position in apertures 281, 282, general purpose anchor 230 is positioned in place against tube member 16, with mounting aperture 236 superposed in the preferred embodiment over tube aperture 281. As shown in FIG. 9, fastener 295 is then inserted through mounting aperture 236 of general purpose anchor 230 and tube aperture 281. Fastener 295 is thereafter fixed in position relative to the structure of tubular member 16; thus if bore 294 is threaded, fastener 295 is tightened to firmly secure general purpose anchor 230 in place.

The fastening of anchors 250, 260 and 270 to a tubular member is accomplished in the same manner, except that in the case of anchors 250 and 270 two bosses 290 and two fasteners 295 are positioned in two sets of apertures 281, 282.

Figure 10:
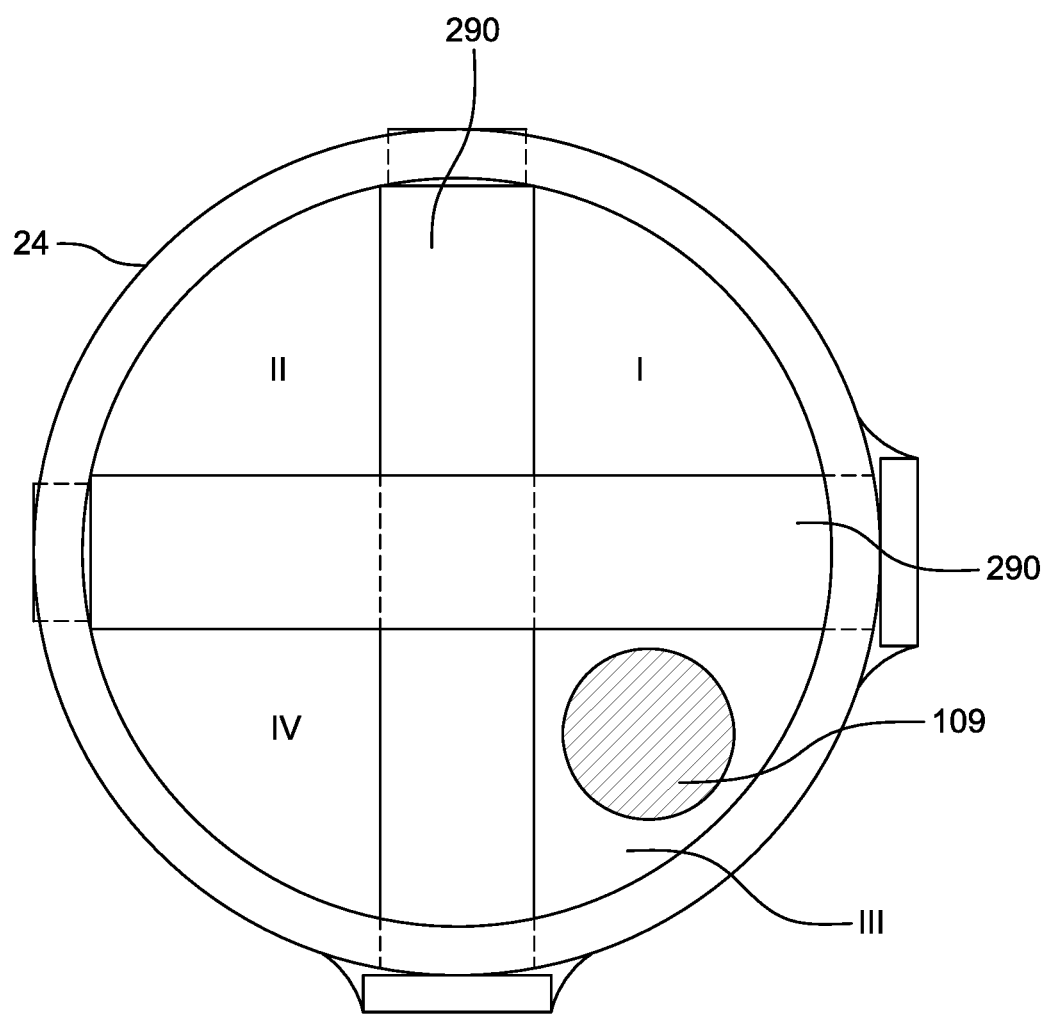
FIG. 10 depicts in cross section a tubular member having two bosses positioned perpendicularly to each other to define four passage sectors, one of which contains an anti-roll torsion bar.

As disclosed above, upper cross member 24 preferably houses anti-roll torsion bar 109. Upper cross member 24 also preferably has each connecting link 165 secured to it using a general purpose anchor 230 with a boss 290 passing through cross member 24 (the positional relationship of these components, exclusive of upper cross member 24, is visible for example in FIGS. 1A and 4). The diameter of each boss 290 when following these preferences is sized to leave sufficient room to define first and second transversely-oriented passages within upper cross member 24 through which can pass anti-roll torsion bar 109. More generally, a plurality of anchors in accordance with this invention can be secured to a tubular chassis member using a plurality of bosses 290, and the centerlines of any two of such bosses 290 may be obliquely oriented to each other (including approximately or exactly perpendicularly oriented to each other) to define four passage segments, through any of which can be positioned a transversely-oriented vehicle segment, such as but not limited to anti-roll torsion bar 109. This is shown in FIG. 10, which depicts two bosses 290 positioned perpendicularly to each other to define four passage sectors I, II, III and IV, each corresponding to a quadrant of the circular cross-section of upper cross member 24; and anti-roll torsion bar 109 is positioned for example in passage sector III.

Suspension Responsive Behavior

The responsive behavior of suspension 100 greatly differs depending upon the type of loads imposed upon it. The five case examples below describe the principal loads that suspension 100 may encounter and its responsive behavior. In these examples, the behavior of the left and right sides of suspension 100 can differ in response to loads. As pertinent in such cases, the left-side and right-side components of suspension 100 will be distinguished with a letter suffix; for example, lower control arm 101R to denote the lower control arm 101 installed on the right side of vehicle chassis 15. In these examples, the described loads are relative to the rest state of the suspension 100.

Case 1: Single Wheel Compression

Figure 11:
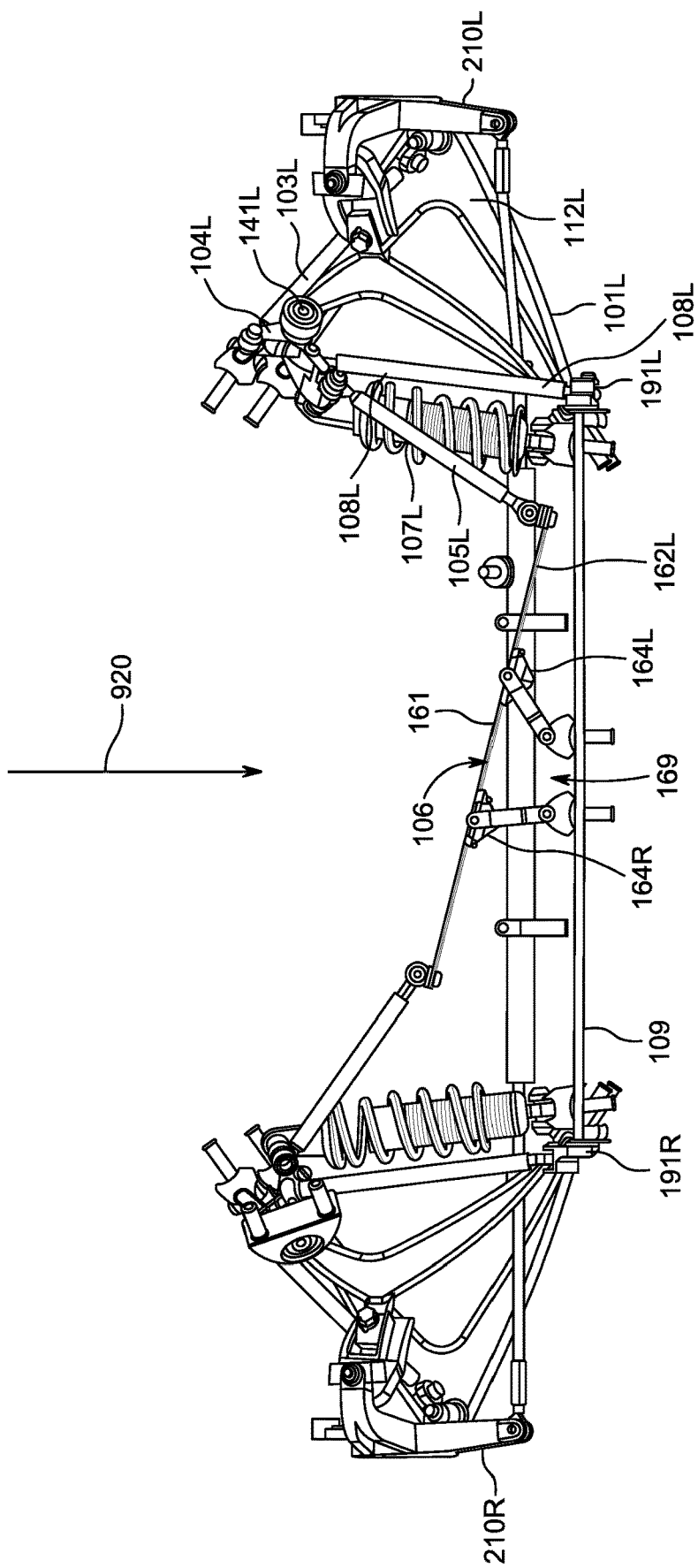
FIG. 11 is a top view of the suspension of the present invention, with the left wheel hub vertically raised relative to its rest state.

In the single wheel compression scenario, illustrated in FIG. 11, it is assumed that wheel hub 210L is subject to a displacement in the upward direction relative to chassis 15. At the same time, it is assumed that a comparable displacement does not take place for the right wheel hub 210R. The single wheel compression scenario can arise, for example, when the wheel mounted to wheel hub 210L hits a bump in the road causing that wheel to rise relative to chassis 15.

In this single wheel compression scenario, the upward displacement of wheel hub 210L relative to chassis 15 causes upward displacement, relative to chassis 15, of lower control arm 101L proximate its apex portion 112L. This upward displacement causes main pushrod 103L to be displaced, which in turn rotates bell crank 104L about shaft 141L. Rotation of bell crank 104L compresses coil over shock absorber 107L, thereby attenuating the upward movement of wheel hub 210L. The rotation of bell crank 104L additionally causes the forward displacement of anti-roll pushrod 108L, which displaces the lever arm 191L to which it is revolutely joined. Since there is no corresponding motion by lever arm 191R, the differential displacement of lever arm 191L relative to lever arm 191R induces an opposing torque in anti-roll bar 109 that resists further upward displacement of wheel hub 210L relative to chassis 15.

The rotation of bell crank 104L additionally causes the displacement of heave pushrod 105L, which urges forward the left side of heave spring assembly 106, causing it to angularly rotate and be displaced toward the left side of chassis 15, as shown in FIG. 11. At the same time, stopper 164L prevents outer section 162L from angularly rotating forward relative to center section 161, and the design of four bar quadrilateral linkage 169 communicates little to no movement to the right side components of suspension 100. As a result, the response of suspension 100 to the single wheel compression scenario is largely or entirely independent of heave spring assembly 106, and instead is in principal part governed by the characteristics of anti-roll bar 109 and coil-over shock absorber 107L.

Case 2: Single Wheel Extension

Figure 12:
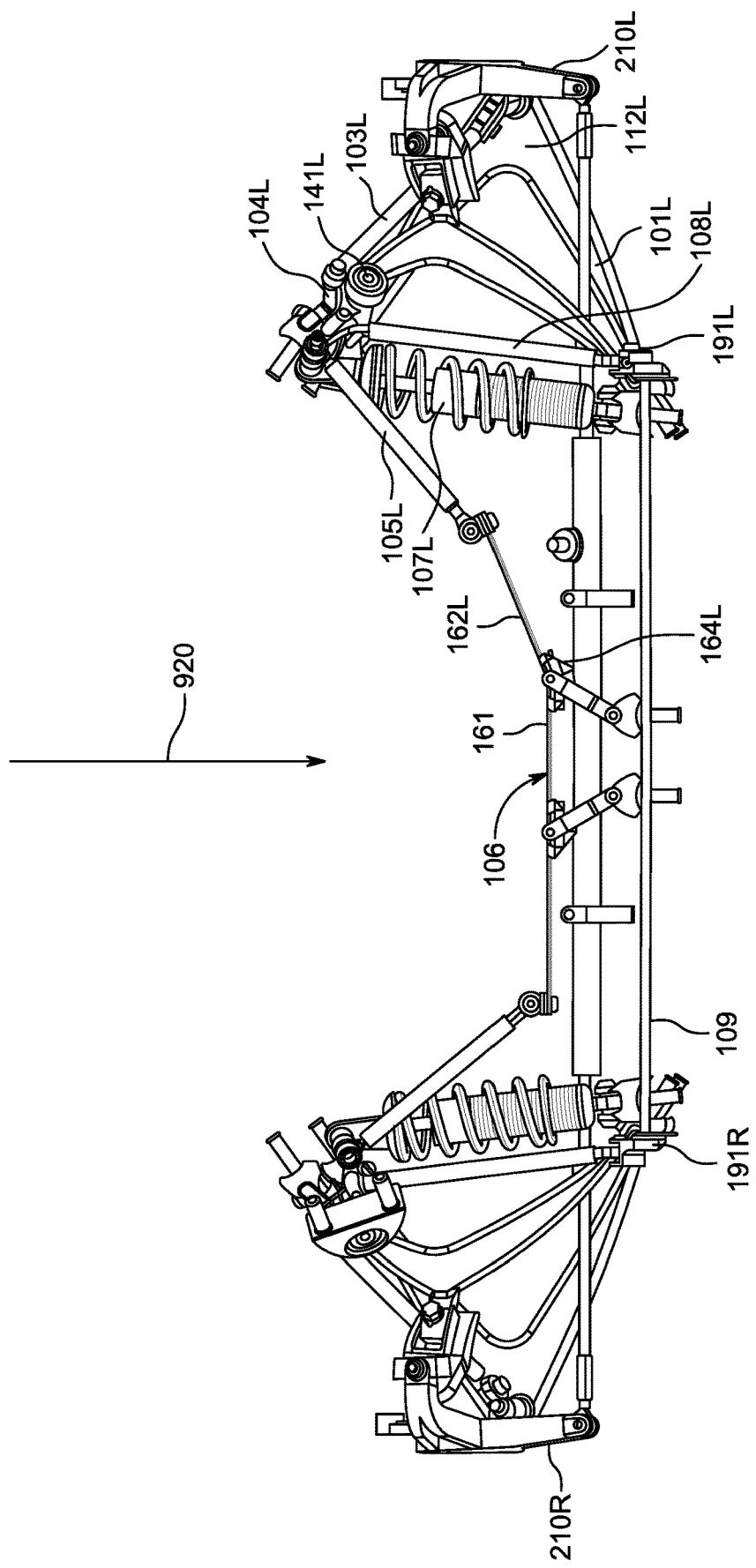
FIG. 12 is a top view of the suspension of the present invention, with the left wheel hub vertically lowered relative to its rest state.

In the single wheel extension scenario, illustrated in FIG. 12, it is assumed that wheel hub 210L is subject to a displacement in the downward direction relative to chassis 15. At the same time, it is assumed that a comparable displacement does not take place for the right wheel hub 210R. This load scenario can arise, for example, when the tire mounted to wheel hub 210L encounters a pothole in the road that causes that wheel to drop relative to the chassis.

In this single wheel extension scenario, the downward displacement of wheel hub 210L relative to chassis 15 causes downward displacement, relative to chassis 15, of lower control arm 101L proximate its apex portion 112L. This downward displacement causes main pushrod 103L to be displaced, which in turn rotates bell crank 104L about shaft 141L. Rotation of bell crank 104L extends coil over shock absorber 107L. Rotation of bell crank 104L additionally causes the rearward displacement of anti-roll pushrod 108L, which displaces the lever arm 191L to which it is revolutely joined. Since there is no corresponding motion by lever arm 191R, the differential displacement of lever arm 191L relative to lever arm 191R induces an opposing torque load on anti-roll bar 109 that resists further downward displacement wheel hub 210L relative to chassis 15.

The rotation of bell crank 104L additionally causes the displacement of heave pushrod 105L, which urges rearward the outer section 162L of heave spring assembly 106. Stopper 164L does not inhibit such movement, and thus outer section 162L angularly rotates rearward relative to center section 161, as shown in FIG. 12, with the result that no substantial movement is communicated to the right side load-bearing components of suspension 100, and the response of suspension 100 to the single wheel extension scenario is largely or entirely independent of heave spring assembly 106, and instead is governed in principal part by the characteristics of anti-roll bar 109 and coil over shock absorber 107L.

Case 3: Two Wheel Compression-Extension

In the two wheel compression-extension scenario, it is assumed that chassis 15 proximate to wheel hub 210L is subject to forces urging that region of chassis 15 in the downward direction, and that simultaneously chassis 15 proximate to wheel hub 210R is subject to forces urging that region of chassis 15 in the upward direction.

This two wheel compression-extension scenario can arise when vehicle 10 makes a turn at higher speeds, such as a turn to the right (see nomenclature of FIG. 1A) for purposes of this example. During such a turn, the wheel hub 210L is on the outside of the turn and the center of mass of vehicle 10 is above the axes of the wheels, so such a turn imposes a vertical force, on the left side of vehicle chassis 15, in addition to the static vehicle weight borne by that side. At the same time, wheel hub 210R is on the inside of the turn, and the location of the center of mass above the axes of the wheels reduces the vertical force on the right side of chassis 15. The two wheel compression-extension scenario that can arise during a turn contributes to a handling characteristic called "body roll," unless corrected. Although this example is with reference to a right turn, a comparable response occurs in a left turn.

The behavior of suspension 100 in the two wheel compression-extension scenario is a combination of the single wheel compression scenario for wheel 210L and the single wheel extension scenario for wheel 210R. In particular, the rotation of bell crank 104L causes the displacement of anti-roll pushrod 108L, which displaces the lever arm 191L to which it is revolutely joined. In addition, bell crank 104R rotates in a direction to cause an opposing motion by lever arm 191R, with the result of further increasing the torque induced in anti-roll bar 109, thereby resisting the tendency to body roll.

At the same time, for the reasons discussed in the single wheel compression scenario above and the single wheel extension scenario above, there is little to no involvement of heave spring assembly 106 in responding to the single wheel compression-single wheel extension scenario. Thus the response of suspension 100 to the two wheel compression-extension scenario is largely or entirely independent of heave spring assembly 106, and instead in principal part is governed by the characteristics of anti-roll bar 109 and coil over shock absorbers 107L and 107R.

Case 4: Two Wheel Compression

In the two wheel compression scenario, it is assumed that chassis 15 is subject to forces urging it in the downward direction in the regions proximate to both wheel hub assemblies 210L and 2108. This load scenario can arise during high speed vehicle operation; as explained above, aerodynamic affects may tend to push down on vehicle 10, causing it to squat unless corrected. It can also arise proximate the front portion of vehicle 10 during vehicle braking (or proximate the rear portion of vehicle 10 during vehicle acceleration).

In this two wheel compression scenario, the downward displacement of chassis 15 relative to wheel hub assemblies 210L, 210R causes upward displacement, relative to chassis 15, of apex portions 112L, 112R of lower control arms 101L, 101R respectively. This upward relative displacement causes main pushrods 103L, 103R to be displaced, which in turn rotates both bell cranks 104L, 104R about their shafts 141L, 141R respectively. Rotation of bell cranks 104L, 104R compress coil over shock absorbers 107L, 107R, thereby attenuating the upward movement of wheel hub assemblies 210L, 210R. The rotation of bell cranks 104L, 104R additionally cause the displacement of anti-roll pushrods 108L, 108R, which displaces the lever arms 191L, 191R to which they are revolutely joined, respectively. However, in this scenario there is relatively equal rotation of both bell crank 104L and 104R, and thus both lever arms 191L and 191R are subject to corresponding movement. In consequence, there is substantially no differential displacement of lever arm 191L relative to lever arm 191R, and there is little to no torque applied to anti-roll bar 109 to resist downward displacement of the chassis 15 relative to wheel hub assemblies 210L, 210R.

On the other hand, the relatively equal rotation of bell cranks 104L and 104R induce approximately the same displacement of heave pushrods 105L and 105R. Thus approximately equal forces are applied to the ends of heave spring assembly 106, urging each side to bend about center section 161. The stoppers 164L and 164R prevent any rotation of outer sections 162 relative to center section 161, and the flexural rigidity of heave spring assembly 106 resists the forward displacement of heave pushrods 105L and 105R, which in turn reduces the squatting effect. Thus suspension behavior in the two wheel compression scenario is largely or entirely dependent upon the characteristics of coil over shock absorbers 107L and 107R and heave spring assembly 106, with anti-roll bar 109 playing substantially no role.

Case 5: Two Wheel Extension

In the two wheel extension scenario, it is assumed that chassis 15 is subject to forces urging it in the upward direction in the regions proximate to both wheel hubs 210L and 210R. This load scenario can arise proximate the front portion of vehicle 10 in the case of rapid acceleration (or proximate the rear portion during vehicle deceleration).

In this two wheel extension scenario, the upward displacement of chassis 15 relative to wheel hubs 210L, 210R causes downward displacement, relative to chassis 15, of apex portions 112L, 112R of lower control arms 101L, 101R respectively. This downward displacement causes main pushrods 103L, 103R both to be displaced, which in turn rotates bell cranks 104L, 104R about shafts 141L, 141R. Rotation of bell cranks 104L, 104R extends coil over shock absorbers 107L, 107R, thereby attenuating the downward movement of wheel hub assemblies 210L, 210R. The rotation of bell cranks 104L, 104R additionally causes the displacement of anti-roll pushrods 108L, 108R. These displacements are approximately the same, with the result that there is no differential displacement of lever arm 191L relative to lever arm 191R, and there is not any substantial torque applied to anti-roll bar 109 to resist upward displacement of the chassis 15 relative to wheel hub assemblies 210L, 210R.

However, as in the case of the two wheel compression scenario, in this two wheel extension scenario there is a relatively equal rotation of both bell crank 104L and 104R, which causes the same rearward displacement of heave pushrod 105L and 105R. Thus equal forces are applied to the ends of heave spring assembly 106, urging each end rearwardly. In this scenario however, stoppers 164L and 164R do not prevent rotation of outer sections 162 relative to center section 161, and accordingly the ends of each outer section 162 freely move rearwardly, without heave spring assembly 106 participating to any substantial degree in resisting two wheel extension. Thus suspension behavior in the two wheel extension scenario is largely or entirely dependent upon the characteristics of coil over shock absorbers 107L and 107R, with heave spring assembly 106 and anti-roll bar 109 playing substantially no role.

Rear Suspension

Although shown in FIG. 1C as mounted to the front of vehicle 10, suspension 100 can be used with equal facility as the rear suspension of vehicle 10 in a substantially mirror-image installation of the front suspension. This is shown in FIGS. 13A and 13B, which depict for exemplary purposes the left rear quarter of vehicle 10. In particular, a bell crank 104 is fastened to upper rear side tubular member 27 utilizing a bearing anchor 250, and the rearward end of shock absorber 107 is secured to upper rear side tubular member 27 utilizing a tangential load anchor 270. Further, connecting links 165 (connected to heave spring assembly 106) are fastened to upper rear cross member 29 utilizing two general purpose anchors 230, and anti-roll torsion bar 109 is positioned within upper rear cross member 28.

In turn, the forward lower bushing 113 of lower control arm 101 is fastened to third upright tubular member 25C utilizing a general purpose anchor 230, and the rearward lower bushing 113 of lower control arm 101 is fastened to fourth upright tubular member 25D using a general purpose anchor 230; tubular members 25C and 25D, which are shown in FIG. 1B, are generally circular in cross section. Similarly, the forward upper bushing 123 of upper control arm 102 is fastened to third upright tubular member 25C utilizing a general purpose anchor 230, and the rearward upper bushing 123 of upper control arm 102 is fastened to fourth upright tubular member 25D using a general purpose anchor 230.

FIGS. 13A and 13B further highlight the compact nature of the suspension 100, the components of which are generally positioned proximate the members of chassis 15 so as to leave open for other uses the interior spaces of chassis 15, and to facilitate engine and other maintenance.

The foregoing detailed description is for illustration only and is not to be deemed as limiting the inventions, which are defined in the appended claims.

What is claimed is:

1. A vehicle suspension, comprising:
 a first load-bearing component assembly and a second load-bearing component assembly, the first and second load bearing component assemblies adapted to be transversely positioned across from each other on a vehicle chassis;
 each load-bearing component assembly comprising a wheel hub, an upper control arm having an apex portion and a base portion, and a lower control arm having an apex portion and a base portion;
 each wheel hub being supported between the apex portions of the upper control arm and the lower control arm of the respective load-bearing component assemblies;
 the base portions of the upper and lower control arms of the respective load-bearing component assemblies being adapted to be pivotally secured to a vehicle chassis to permit upward and downward vertical movement of each wheel hub, relative to a rest state, in response to load variations; and
 a directionally-dependent heave spring assembly adapted to be transversely secured to a vehicle chassis, the heave spring assembly coupled to the first load-bearing component assembly and to the second load-bearing component assembly and exhibiting resiliency in opposition to upward vertical movement of both wheel hub assemblies relative to their rest states, and exhibiting substantially no resiliency in opposition to downward vertical movement of both wheel assemblies relative to their rest states.

2. A vehicle assembly, comprising:
 a vehicle chassis having a transversely-oriented tubular member;
 a vehicle suspension including a first wheel hub and a second wheel hub, the first wheel hub and the second wheel hub secured to the vehicle chassis and transversely positioned across from each other on the vehicle chassis;
 the vehicle suspension further including an anti-roll bar;
 a portion of the vehicle suspension secured to the transversely-oriented tubular member with an anchor assembly secured to the transversely-oriented tubular member, and a portion of the vehicle suspension secured to the anchor assembly;
 the anchor assembly comprising an anchor base and first and second opposed spaced-apart anchor cheek members extending from the anchor base, the portion of the vehicle suspension fastened to the anchor cheek members, the anchor base comprising a load-bearing skirt positioned in contact with the exterior surface of the transversely-oriented tubular member, the load-bearing skirt having a pair of spaced-apart opposed cut-outs, each of the pair of cut-outs having a shape that generally conforms to a shape of the exterior surface of the transversely-oriented tubular member;
 the anchor assembly further comprising a first boss positioned in first and second opposed apertures in the exterior surface of the transversely-oriented tubular member to define first and second transversely-oriented passages within the transversely-oriented tubular member, and a fastener connected to the anchor base and the first boss to secure the anchor base to the first boss; and
 the anti-roll bar positioned in the first or second transversely-oriented passage of the transversely-oriented tubular member to connect the first wheel hub and the second wheel hub.

3. The vehicle assembly as in claim 2, further comprising a second anchor assembly comprising a second boss positioned in third and fourth opposed apertures in the exterior surface of the transversely-oriented tubular member, a centerline of the third and fourth opposed apertures being obliquely aligned with a centerline of the first and second opposed apertures to define a first passage segment and a second passage segment in the first transversely oriented passage, and a third passage segment and a fourth passage segment in the second transversely-oriented passage, the anti-roll bar positioned in one of the first, second, third and fourth passage segments of the the transversely-oriented tubular member to connect the first wheel hub and the second wheel hub.

* * * * *